United States Patent [19]
Furuta et al.

[11] Patent Number: 5,997,765
[45] Date of Patent: Dec. 7, 1999

[54] LIQUID CRYSTAL POLYESTER RESIN COMPOSITION

[75] Inventors: Motonobu Furuta, Chiba; Takanari Yamaguchi, Ibaraki, both of Japan

[73] Assignee: Sumitomo Chemical Company, Limited, Osaka, Japan

[21] Appl. No.: 08/802,258

[22] Filed: Feb. 19, 1997

[30] Foreign Application Priority Data

| Feb. 19, 1996 | [JP] | Japan | 8-030710 |
| Jul. 17, 1996 | [JP] | Japan | 8-187104 |
| Aug. 26, 1996 | [JP] | Japan | 8-223776 |
| Sep. 18, 1996 | [JP] | Japan | 8-246275 |
| Sep. 27, 1996 | [JP] | Japan | 8-256034 |
| Nov. 28, 1996 | [JP] | Japan | 8-318275 |

[51] Int. Cl.$^6$ .................. C09K 19/38; C09K 19/46; B32B 27/36; C08L 67/00
[52] U.S. Cl. .................. 252/299.01; 252/299.67; 206/709; 428/483; 428/411.1; 524/539; 524/604; 524/605
[58] Field of Search .................. 252/299.01, 299.67; 428/1.1, 411.1, 480, 483; 525/66, 133, 40; 524/500, 539, 604, 605; 206/96, 709

[56] References Cited

U.S. PATENT DOCUMENTS

| 5,216,073 | 6/1993 | Haider et al. | 525/66 |
| 5,242,981 | 9/1993 | Izumi et al. | 525/133 |
| 5,268,414 | 12/1993 | Nakai et al. | 524/539 |

FOREIGN PATENT DOCUMENTS

| 364388A1 | 4/1990 | European Pat. Off. |
| 4-202462 | 7/1992 | Japan |

*Primary Examiner*—Shean C. Wu
*Attorney, Agent, or Firm*—Birch, Stewart, Kolasch & Birch, L.L.P.

[57] ABSTRACT

A liquid crystal polyester resin composition comprising a liquid crystal polyester (A) in a continuous phase and a rubber having a functional group reactive with the liquid crystal polyester (B) in a dispersed phase. A liquid crystal polyester resin composition of the present invention is excellent in heat resistance, molding processability and mechanical properties, particularly in impact resistance and tensile property, capable of improving anisotropy of a molded article. Furthermore, film formation processability can be improved at a low cost, and a film produced for the composition has excellent gas barrier property, drawing property and flexibility.

34 Claims, No Drawings

LIQUID CRYSTAL POLYESTER RESIN COMPOSITION

BACKGROUND OF THE INVENTION

1. Field of the Invention

The present invention relates to a liquid crystal polyester resin composition useful for forming to films or molded articles by injection molding or extrusion molding.

2. Description of the Prior Arts

Unlike crystalline polyesters such as polyethylene terephthalate and polybutylene terephthalate, a liquid crystal polyester consisting of rigid molecules does not become entangled even under the melting condition, but forms a polydomain in a liquid crystal state and has low shear properties to realize a remarkably high orientation of molecular chains towards the flow. So, the liquid crystal polyester is called thermotropic liquid crystal polymers. This specific behavior causes excellent melt flow properties and gives thin-wall molded articles of 0.2 through 0.5 mm in thickness having high strength and high rigidity easily. Molded articles of a liquid crystal polyester, on the other hand, have various disadvantages, including extremely large anisotropy. The insufficient vibration-damping properties and the high molding temperature undesirably restrict its applications to various fields. There have been a problem of manufacturing cost of a liquid crystal polyester.

In the market, there has been a strong demand for an improved liquid crystal polyester resin composition, which is manufactured at low cost and exhibits improved vibration-damping properties and anisotropy in the form of molded articles while maintaining the excellent heat resistance and mechanical properties of a liquid crystal polyester.

A resin composition disclosed in JP-A-56-115357 includes a melt processable polymer and an anisotropic melt processable polymer. The processabilities of a melt processable polymer have been enhanced by mixing an anisotropic melt processable polymer with the melt processable polymer. An example of such resin compositions is a mixture of polyphenylene ether and polystyrene blended with a liquid crystal polyester.

Another resin composition disclosed in JP-A-2-97555 is prepared by mixing a variety of polyarylene oxides with a liquid crystal polyester to improve the solder heat resistance.

Any conventional resin composition prepared by mixing a liquid crystal polyester of a high molding temperature with a non-crystalline polymer of a lower molding temperature, such as polyphenylene ether, results in poor appearance of molded articles due to pyrolysis of the resin mixture during the high-temperature molding while having the improved melt processability. Other drawbacks include insufficient heat resistance, mechanical properties, and impact resistance of the resulting composition.

Proposed resin compositions including a liquid crystal polyester and an aromatic polycarbonate, as disclosed in JP-A-57-40551 JP-A-2-102257, do not have sufficient heat resistance or mechanical properties.

JP-A-58-201850, JP-A-1-121357, JP-A-1-193351, the EP 67272/A2, and JP-A-7-304936 disclose a composition comprising a liquid crystal polymer applied with a copolymer of an α-olefin and, for example, glycidyl methacrylate. However, the composition needs further improvement in terms of mechanical properties such as impact resistance and tensile strength.

Furthermore, the U.S. Pat. No. 5,216,073 discloses a blended product comprising an epoxidated rubber applied with a liquid crystal polymer. However, the product is insufficient in heat resistance and mechanical properties.

On the other hand, liquid crystal polyesters have characteristics such as molecular orientation in the molten state owing to a strong molecular interaction. Therefore, application of the liquid crystal polyesters in the industrial field as a film material having functions such as a gas barrier property in addition to known properties such as excellent strength, elastic modulus and heat resistance has been desired.

However, unlike aromatic polyesters such as polyethylene terephthalate and polybutylene terephthalate, since rigidity of molecules in liquid crystal polyesters prevents entanglement even in a molten state and allows significant orientation of molecular chain to the aligned direction, they show behaviors such as drastic decline of the melt viscosity by slight shear increase and drastic decline of the melt viscosity by temperature rising, resulting in an extremely low melt tension in a molten state. Therefore, in the field of film molding or blow molding there is a problem of practicability due to difficulty in maintaining a certain shape in a molten state, and difficulty in balancing properties in longitude and latitude due to the molecular orientation, which may result in rupture in the alignment direction of the molecules. Accordingly, films comprising a liquid crystal polyester utilizing advantageous properties of liquid crystal polyesters has not been applied to a practical use sufficiently.

Concerning such liquid crystal polyesters, JP-A-52-1095787 and JP-A-58-317187 disclose a laminated product having uniaxially aligned liquid crystal polyester films attached so as to cancel a high anisotropy. However, such product is not efficient in terms of productivity and has a problem of peeling of the films.

The U.S. Pat. No. 4,975,312 and WO 9015706 disclose a technique to cancel the anisotropy of a liquid crystal polyester by a method of rotating ring dies, and JP-A-62-25513, JP-A-63-95930 and JP-A-63-24251 disclose a special technique in a T die method. However, these are methods of alleviating the anisotropy with a special molding method, and have drawbacks in practicability such as high cost and limitation in formation of a thin film.

JP-A-62-187033, JP-A-64-69323, JP-A-2-178016, JP-A-2-253919, JP-A-2-253920, and JP-A-253950 propose a multilayer (laminate) sheet comprising a liquid crystal polyester and a thermoplastic resin and a multilayer (lamination) film. However, these sheets have problems such as peeling caused by a large orientation of a liquid crystal polyester or by the existence of an adhesive layer between the layers, declining in properties inherent to a liquid crystal polyester such as gas barrier property and heat resistance, and difficulty in the thin film production.

On the other hand, an inflation film formation has been attempted for obtaining a liquid crystal polyester film having an alleviated anisotropy of a liquid crystal polymer and an excellent strength.

The inflation film formation method refers to a method in which a resin melt-kneaded in an extruder is extruded from a die having a circular slit to form a tubular molten product, which in turn is expanded by supplying certain amount of air therein while cooling periphery of the tube to produce a tubular film.

As examples thereof, JP-A-63-173620, JP-A-3-288623, JP-A-4-4126, JP-A-4-50233, and JP-A-4-49026 disclose a method of inflation film formation of a liquid crystal polyester. However, these film formation methods cannot be used widely since the methods require a special film formation device and a very severe condition owing to a characteristics of liquid crystal polyesters. Besides, films obtained in the methods have drawbacks such as insufficiency in stretching property, flexibility and gas barrier property, difficulty in thin film formation and high expenses.

Many researches and developments have been conducted on wrapping materials for pouching and standing pouching.

For example, JP-A-62-103139 discloses a wrapping material for retort pouching comprising a resin film having silicon dry-plated on the surface thereof.

JP-A-1-308826 discloses a wrapping material for retorted product mainly comprising an ethylene-vinyl alcohol copolymer.

JP-A-2-180129 discloses a retort pouch selected from the group consisting of an ethylene-vinyl alcohol copolymer film and a vinylidene chloride copolymer film.

Regarding aluminum deposition films or films having an inorganic material such as silicon deposited or coated thereon, many problems are pointed out such as inapplicability to a micro wave oven, insufficient heat resistance of a base resin film, and residual ash component after incineration.

Further, in the case of using a polyvinylidene chloride film, insufficiency in heat resistance in the retort processing, and a waste gas issue at the time of incineration after use are pointed out. In the case of using an ethylene-vinyl alcohol copolymer film, an ethylene-vinyl acetate copolymer film, or a polyester film, the films are insufficient in heat resistance, water vapor barrier property and water resistance.

On the other hand, although aluminum foil is broadly used as a wrapping material for pouching, they have many problems such as inapplicability to a micro wave oven or disposal by incineration, and sensitivity to a metal detector.

JP-A-2-261456, JP-A-5-278747, JP-A-7-237281, and JP-A-7-241967 disclose a standing pouch or a wrapping material comprising a multilayer laminated film.

However, as to multilayer laminated films, various problems, such as difficulty in production and generation of peeling-off between the layers, have not been solved so far.

Therefore, wrapping materials for pouching, with good gas barrier property and molding-processing property, and excellent heat resistance, and applicable to a micro wave oven, are strongly demanded in the market.

Although containers having a gas barrier property are broadly used in the industrial fields, conventional gas barrier type containers do not satisfy the needs of the market. That is, requirements toward a gas barrier type container include not only an excellent gas barrier property but also applicability to a micro wave oven, heat resistance for allowing the use as a wrapping material for a retorted food to endure heat processing, molding-processing property for facilitating film formation a the base of a container, recycling after use, and easy disposal. Conventional gas barrier type containers do not sufficiently satisfy these requirements.

For example, polypropylene is insufficient in terms of a gas barrier property, and an ethylene-vinyl acetate copolymer has a drastic decline of a gas barrier property in the moisture absorption and is insufficient in heat resistance. Poly(vinylidene chloride) has a low heat resistance, and further, has a problem in terms of environmental concern after disposal due to comprised chlorine.

Polyethylene terephthalate (hereinafter abbreviated as PET) is insufficient in terms of heat resistance and water vapor barrier property.

A gas barrier material comprising an ethylene-vinyl acetate copolymer or PET having an inorganic material such as silica and alumina deposited thereon, and a gas barrier material comprising a thermoplastic resin attached with an aluminum foil are insufficient in heat resistance, have a problem of peeling-off of a film, besides, in the case of a material comprising a metal, there is a problem of inapplicability to a micro wave oven.

Hollow molded containers comprising a resin having a light weight and a gas barrier property are used in the application for food, beverage, industrial chemicals and cosmetics. For example, hollow molded containers comprising an ethylene vinyl alcohol copolymer, vinylidene chloride or polyethylene terephthalate are known. However, hollow molded containers obtained by blow molding these resins are not sufficient in heat resistance and gas barrier property. Further, in the case of filling contents to a hollow molded container at a high temperature, or washing the container with a liquid of high temperature, the containers of these resins may not be sufficient in heat resistance.

Although liquid crystal polyesters have been known for having a good heat resistance and an excellent gas barrier property, it is quite difficult to have a good hollow molded container of a liquid crystal polyester by blow molding due to a large anisotropy and a low melt viscosity of liquid crystal polyesters.

Concerning molded bottles comprising a liquid crystal polyester or a liquid crystal polyester resin composition, JP-A-61-192762 discloses a hollow molded container obtained by melt-molding a resin composition comprising a liquid crystal polyester and a polyester having a specific structure.

JP-A-2-260646 and JP-A-3-269054 disclose a container having an excellent gas barrier property obtained by molding a blended product of polyethylene terephthalate and a liquid crystal.

JP-A-1-289826 discloses a molded article of a laminated product comprising a polyethylene terephthalate layer and a liquid crystal polyester layer. Further, JP-A-4-166320 discloses a production method of a container comprising a liquid crystal polyester having a specific structure.

However, in either case, due to poor molding processability of the resin, there are problems such as difficulty in producing a molded container having a good appearance, low production efficiency, and an insufficient gas barrier property of a container. And thus requirements from the market have not been sufficiently satisfied.

On the other hand, in the field of automobile industry, examination has been made for a long time on a plastic gasoline tank for a light weight, molding processability, strength and freer designing so as to meet the requests from the market.

For example, polyethylene is excellent in molding processability and strength, but insufficient in the gasoline barrier property, which is the barrier property with respect to gasoline.

JP-A-1-14049 discloses a fuel tank comprising a multilayer hollow molded article formed with a barrier layer comprising a material selected from the group consisting of polyamide, polyester and an ethylene-vinyl acetate copolymer, and a modified polyolefin layer.

JP-A-4-47938 discloses a fuel tank comprising a multilayer hollow molded article formed with a polyamide layer, a high density polyethylene layer, and a modified high density polyethylene layer.

However, these fuel tanks comprising a barrier layer of a polyamide layer are insufficient in the gasoline barrier property, and further insufficient in the barrier property with respect to an mixture fuel comprising alcohol such as methanol.

JP-A-6-191296 discloses a fuel tank for automobile of a hollow molded article comprising a multilayer structure with a barrier layer of a copolymer polyamide layer of aromatic polyamide and nylon 6, further comprising a modified high density polyethylene layer and a high density polyethylene layer.

Further, JP-A-6-218891 discloses a fuel tank for automobile of a multilayer molded article having a barrier layer of a blended product of polyethylene and polyamide.

JP-A-7-52333 discloses a fuel tank of a multilayer structure having a resin composition layer comprising an ethylene-vinyl alcohol copolymer applied with a thermoplastic resin. And JP-A-7-40998 discloses flame retardant foam plastic.

However, these fuel tanks have shortcomings such as insufficiency in gasoline barrier property or gasohol barrier property, which is the barrier property with respect to a mixture of gasoline and methanol, and the need of having a very thick resin layer so as to maintain a high barrier property.

Furthermore, various problems such as peeling between layers due to the multilayer structure of the tank exist, which have not been solved yet.

Since molded articles such as sheet and film of a foam resin are lightweight and comparatively strong, they are broadly used in the fields of wrapping material, construction material, industrial equipment, business equipment and cushion material. However, in particular, in the fields of electric or electronic equipment and automobile parts, a foam resin having heat resistance and mechanical properties superior to conventional products are desired in the market.

Liquid crystal polymers are resins basically capable of satisfying such required properties, and thus foam products thereof have been examined conventionally. For example, the U.S. Pat. No. 4,429,061 discloses a foam product of aromatic polyester, having a specific naphthalene skeleton structure. The Japanese Patent Publication Hei No. 2-42099 discloses a polymer foam product comprising a specific liquid crystal polymer. JP-A-3-179042 discloses a production method of a foam product of a liquid crystal polymer. Furthermore, the Japanese Patent Publication Hei No. 5-25901 discloses a foam product containing a liquid crystal polyester and an inert filler. JP-A-4-318039 discloses a liquid crystal polymer foam product defining a diameter of a cell of the foam product. The Japanese Patent Publication No. 7-74285 discloses a foam resin molded article comprising a liquid crystal polymer with a specific structure.

However, conventional liquid crystal polymer foam products still have problems such as a large anisotropy of the foam product, insufficiency in mechanical properties, poor appearance, and a high cost.

SUMMARY OF THE INVENTION

Accordingly, an object of the present invention is to provide a liquid crystal polyester resin composition maintaining excellent heat resistance and mechanical properties of a liquid crystal polyester, capable of providing a molded article having excellent molding processability and impact resistance with an improved anisotropy, and capable of providing a film having an excellent film formation property, gas barrier property and drawing property at a low cost.

That is, the present invention relates to:

1. a liquid crystal polyester resin composition constituting a liquid crystal polyester (A) in a continuous phase, and a rubber having a functional group reactive with the liquid crystal polyester (B) in a dispersed phase; and 2. a liquid crystal polyester resin composition constituting 56.0 to 99.9 weight % of a liquid crystal polyester (A) and 44.0 to 0.1 weight % of a rubber having a functional group reactive with the liquid crystal polyester (B). Further, the present invention provides a composition applicable to molded articles, containers, tubes, sorts, fibers, coating materials, food wrapping films, chemical wrapping films, and electronic material wrapping films.

[21]

DETAILED DESCRIPTION OF THE INVENTION

A liquid crystal polyester used as the component (A) of a liquid crystal polyester resin composition of the present invention is a polyester called "thermotropic liquid crystal polymer".

More specifically, examples of the component (A) include:

(1) those comprising a combination of an aromatic dicarboxylic acid, an aromatic diol, and an aromatic hydroxycarboxyic acid;

(2) those comprising a combination of aromatic hydroxycarboxylic acid of different kinds;

(3) those comprising a combination of an aromatic dicarboxylic acid and a nuclear-substituted diol; and (4) those obtainable by the reaction of a polyester such as polyethylene terephthalate with an aromatic hydroxycarboxylic acid; which form an anisotropic molten product at a temperature of 400° C. or lower. Further, in place of the aromatic dicarboxylic acid, the aromatic diol, or the aromatic hydroxycarboxylic acid, derivatives thereof having ester formation property can be used.

Examples of repeating units of the liquid crystal polyesters are shown below, however, they are not limited thereto.

A repeating unit derived from an aromatic dicarboxylic acid:

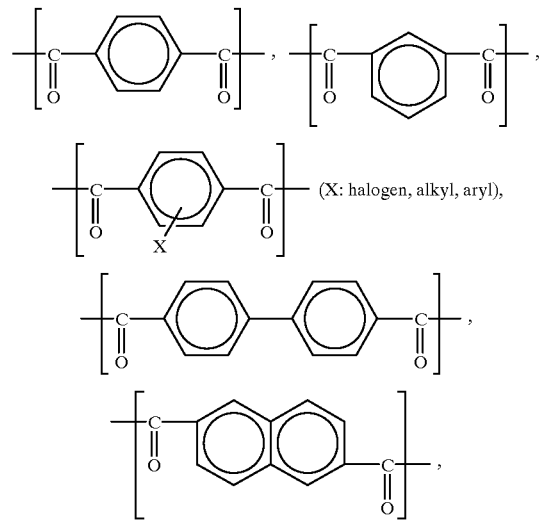

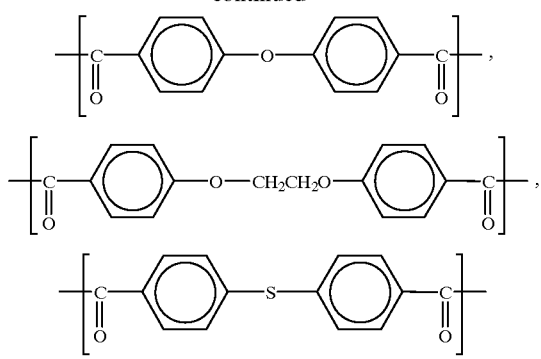

A repeating unit derived from an aromatic diol:

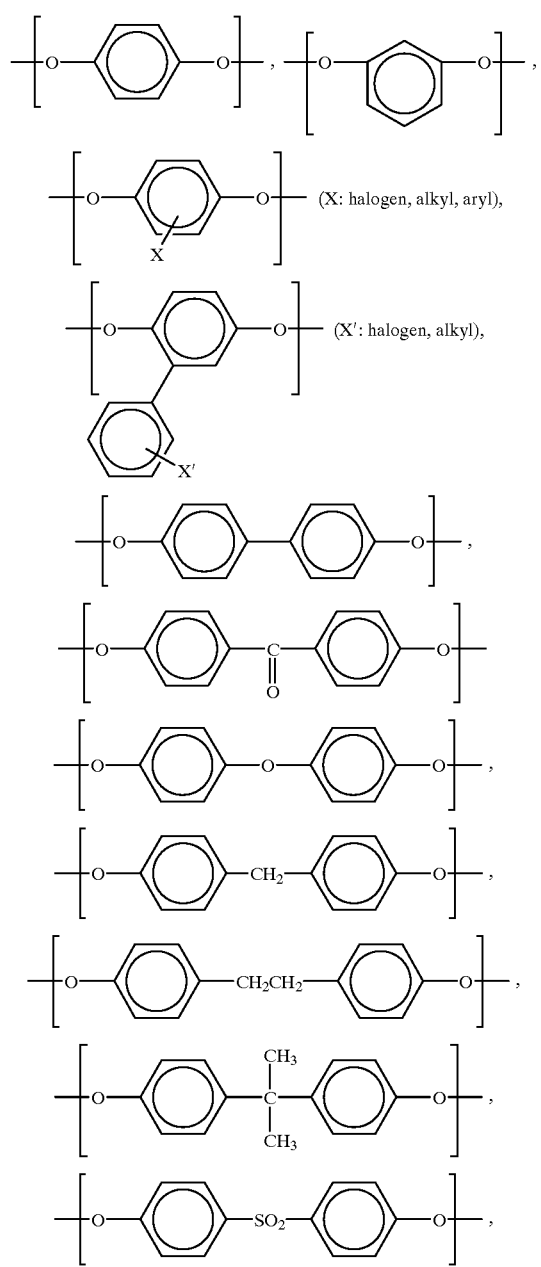

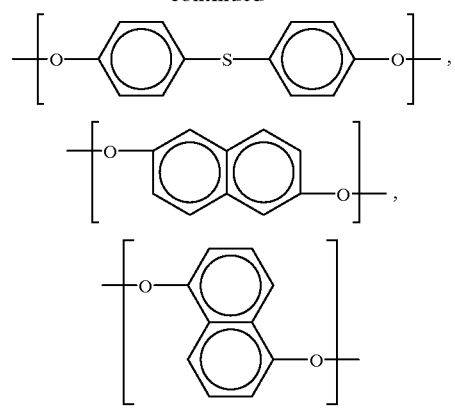

A repeating unit derived from an aromatic hycarboxylic acid:

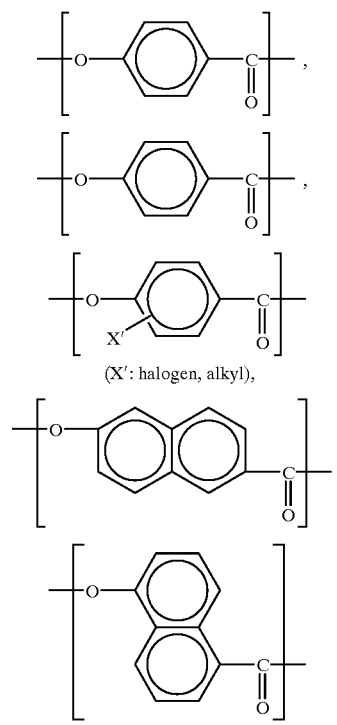

Liquid crystal polyesters including a repeating unit:

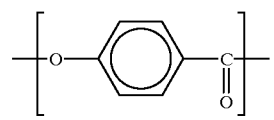

are particularly preferable in heat resistance, mechanical properties, and processability, and those including at least 30 mole % of the repeating unit are further preferable.

Specific examples of combination of repeating units are shown below.

(I)
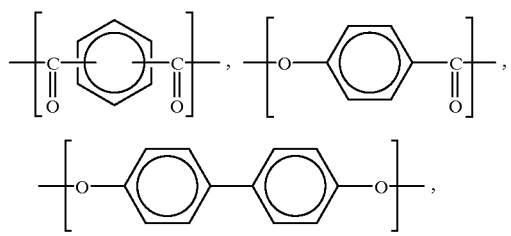

(II)
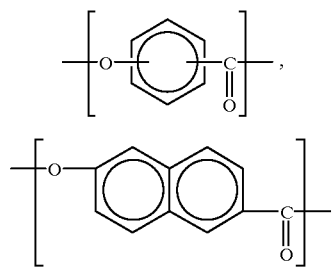

(III)
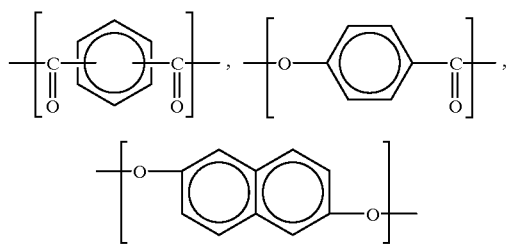

(IV)
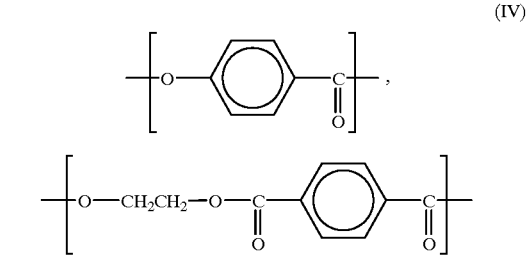

(V)
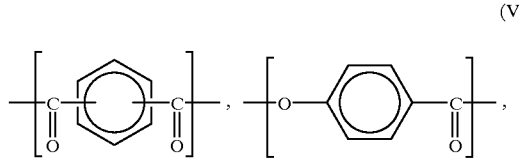

(VI)
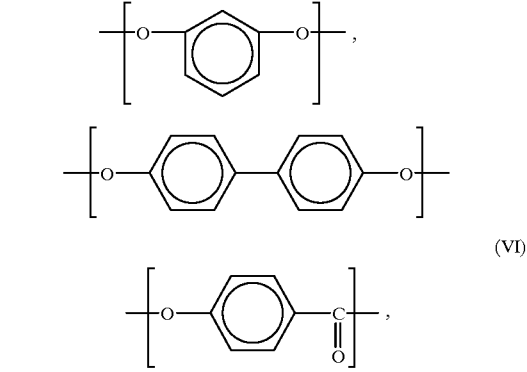

-continued
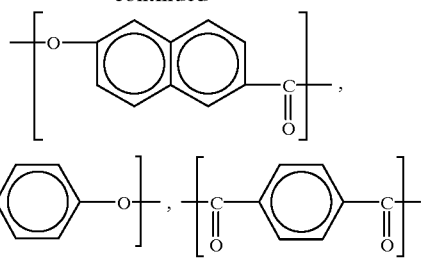

Production method of the above-mentioned liquid crystal polyesters (I) to (VI) are disclosed in the Japanese Patent Publication Sho No. 47-47870, the Japanese Patent Publication Sho No. 63-3888, the Japanese Patent Publication Sho No. 63-3891, the Japanese Patent Publication Sho No. 56-18016, and the Japanese Patent Publication Hei No 2-51523.

Among these combination examples, (I), (II), and (IV) are preferable, and (I) and (II) are more preferable.

In the liquid crystal polyester resin compositions of the present invention, a liquid crystal polyester as an (A) component comprising 30 to 80 mole % of the below-mentioned repeating unit (a'), 0 to 10 mole % of the below-mentioned repeating unit (b'), 10 to 25 mole % of the below-mentioned repeating unit (c'), and 10 to 35 mole % of the below-mentioned repeating unit (d') is preferably used in the invention in the field where a high heat resistance is required.

(a')
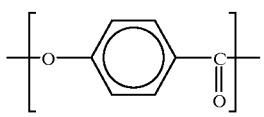

(b')
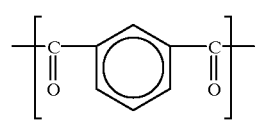

(c')
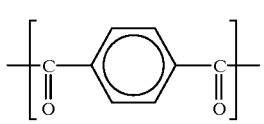

(d')

(in the formulae, Ar denotes a divalent aromatic group.)

In the liquid crystal polyester resin compositions, a component (B) is a rubber having a functional group reactive with a liquid crystal polyester of component (A).

A "rubber" herein corresponds to a polymer having rubber elasticity in a room temperature disclosed in the new edition polymer dictionary (compiled by the Polymer Society, published in 1988 by Asakura Shoten). Examples thereof include natural rubber, butadiene polymer, butadiene-styrene copolymer (including random copolymer, block copolymer (including SEBS rubber and SBS rubber), and graft copolymer), or hydrogenated products thereof, isoprene polymer, chlorobutadiene polymer, butadiene-acrylonitrile copolymer, isobutylene polymer, isobutylene-butadiene copolymer, isobutylene-isoprene copolymer, acrylate-ethylene containing copolymer rubber, ethylene-propylene copolymer rubber, ethylene-butene copolymer rubber, ethylene-propylene-styrene copolymer rubber, styrene-isoprene copolymer rubber, styrene-butylene copolymer, styrene-ethylene-propylene copolymer rubber, perfluorinated rubber, fluorinated rubber, chloroprene rubber, butyl rubber, silicone rubber, ethylene-propylene-nonconjugated diene copolymer rubber, thiol rubber, polysulfide rubber, polyurethane rubber, polyether rubber (such as polypropylene oxide), epichlorohydrin rubber, polyester elastomer, and polyamide elastomer. Among these examples, acrylate-ethylene copolymer is preferable, and (meth)acrylate-ethylene copolymer rubber is further preferable.

These rubber-like materials can be produced in any production method such as an emulsion polymerization method and a solution polymerization method, with any catalyst such as trialkylaluminum, lithium halide and nickel containing catalyst.

Rubbers (B) of the present invention include the above-mentioned rubbers, having a functional group reactive with a liquid crystal polyester (A). A functional group reactive with the liquid crystal polyester is not particularly limited as long as it reacts with the liquid crystal polyester, but examples thereof include an epoxy group, an oxazolyl group, and an amino group. Among these examples, an epoxy group is preferable. Among functional groups having an epoxy group, a glycidyl group is preferable. Among monomers having a glycidyl group, unsaturated carboxylic acid glycidyl ester and unsaturated glycidyl ether are preferably used.

That is, preferable examples of rubbers having a functional group reactive with a liquid crystal polyester (B) of the present invention include (meth)acrylate-ethylene-unsaturated carboxylic acid glycidyl ester and/or unsaturated glycidyl ether copolymer rubber.

In a rubber (B) of the present invention, method of introducing a functional group reactive with a liquid crystal polyester into the rubber is not particularly limited but a known method can be used. For example, it is possible to introduce a monomer having the functional group by copolymerization in a synthetization stage of a rubber, or it is also possible to graft copolymerize a rubber and a monomer having the functional group.

(Meth)acrylate, which is a main component of (meth)acrylate-ethylene-unsaturated carboxylic acid glycidyl ester and/or unsaturated glycidyl ether copolymer rubber, is an ester obtained from acrylic acid or methacrylic acid and alcohol. As alcohol, alcohol having 1 to 8 carbon atoms is preferable. Examples of (meth)acrylate include methyl acrylate, methyl methacrylate, n-butyl acrylate, n-butyl methacrylate, tert-butyl acrylate, ter-butyl methacrylate, 2-ethyl hexyl acrylate, and 2-ethyl hexyl methacrylate. These (meth)acrylates can be used alone or in combination of two or more.

Compounds having an unsaturated carboxylic acid glycidyl ester unit or an unsaturated glycidyl ether unit are represented by the below-mentioned general formulae (1) and (2):

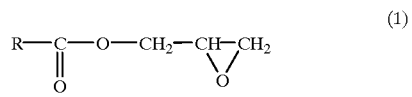

(1)

(R denotes a hydrocarbon group having 2 to 13 carbon atoms with an ethylene type unsaturated bond)

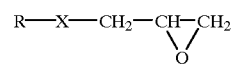

(2)

(R denotes a hydrocarbon group having 2 to 18 carbon atoms with an ethylene type unsaturated bond, and x denotes —CH2—O—or

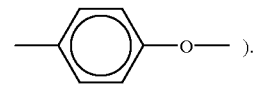

).

Examples of unsaturated carboxylic acid glycidyl ester include glycidyl acrylate, glycidyl methacrylate, itaconic acid diglycidyl ester, butene tricarboxylic acid triglycidyl ester and p-styrene carboxylic acid glycidyl ester.

Examples of unsaturated glycidyl ether include vinyl glycidyl ether and allyl glycidyl ether.

The above-mentioned (meth)acrylate-ethylene-unsaturated carboxylic acid glycidyl ester and/or unsaturated glycidyl ether copolymer rubber can be produced in an ordinary method, such as bulk polymerization, emulsion polymerization and solution polymerization with a free radical initiator. An representative polymerization method is disclosed in the Japanese Patent Publication No. 46-45085 and JP-A-61-127709. That is, production can be conducted in the conditions of a 500 kg/cm$^2$ or more pressure, 40 to 300° C. temperature in the presence of a polymerization initiator capable of generating a free radical.

Component ratio of the above-mentioned (meth)acrylate-ethylene-unsaturated carboxylic acid glycidyl ester and/or unsaturated glycidyl ether copolymer rubber is preferably more than 40 but less than 97 weight %, more preferably 45 to 70 weight % of (meth)acrylate, preferably more than 3 but less than 50 weight %, more preferably 10 to 49 weight % of an ethylene unit, and preferably more than 0.1 but less than 30 weight %, more preferably 0.5 to 20 weight % of an unsaturated carboxylic acid glycidyl ester and/or unsaturated glycidyl ether unit. If the ratio of (meth)acrylate is less than 40 weight %, both the rubber elasticity and the impact resistance improvement effect of the composition lower and on the other hand, if the ratio is more than 97 weight %, the embrittlement point of the copolymer rubber becomes higher to lower mechanical properties of the composition at a low temperature, and thus neither is preferable.

Besides, if the ratio of unsaturated carboxylic acid glycidyl ester and/or unsaturated glycidyl ether is less than 0.1 weight %, impact resistance of the liquid crystal polyester resin composition lowers, and on the other hand, if the ratio is more than 30 weight %, rigidity of the composition lowers, and thus neither is preferable.

The above-mentioned (meth)acrylate-ethylene-unsaturated carboxylic acid glycidyl ester and/or unsaturated glycidyl ether copolymer rubber may further contain another monomer polymerizable with the above-mentioned (meth)acrylate, ethylene, unsaturated glycidyl ester, and unsaturated glycidyl ether. Examples of the monomer include isobutylene, styrene and derivatives thereof, vinyl acetate, tetrafluoroethylene and halogenated olefins such as hexafluoropropylene.

Mooney viscosity of the above-mentioned (meth)acrylate-ethylene-unsaturated carboxylic acid glycidyl ester and/or unsaturated glycidyl ether copolymer rubber (B) is 3 to 70, preferably 3 to 30, more preferably 4 to 25. The "Mooney viscosity" herein denotes a value measured by a 100° C. large rotor according to the JIS K6300.

As a component (B) in the invention, an acrylic rubber having a functional group reactive with liquid crystal polyester can be also used. The acrylic rubber mainly comprises at least one selected from the group consisting of the monomers represented by the below-mentioned general formulae (3) to (5):

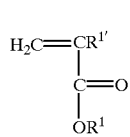
(3)

wherein $R^1$ denotes an alkyl group or a cyano alkyl group having 1 to 18 carbon atoms, and $R^{1'}$ denotes a hydrogen atom or a methyl group;

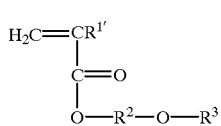
(4)

wherein $R^2$ denotes an alkylene group having 1 to 12 carbon atoms, and $R^3$ denotes an alkyl group having 1 to 12 carbon atoms; and

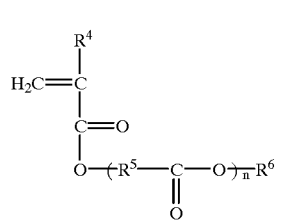
(5)

wherein $R^4$ denotes a hydrogen atom or a methyl group, $R_5$ denotes an alkylene group having 3 to 30 carbon atoms, $R^6$ denotes an alkyl group having 1 to 20 carbon atoms or a derivative thereof, and n denotes an integer from 1 to 20.

Examples of functional groups reactive with liquid crystal polyesters include epoxy group, oxazolyl group, amino group, and among them, epoxy group is preferable. As an epoxy group, glycidyl group is exemplified preferably. As a monomer having glycidyl groups, unsaturated carboxylic acid glycidyl ester and unsaturated glycidyl ether can be used preferably.

Examples of alkyl acrylates represented by the above-mentioned general formula (3) include methyl acrylate, ethyl acrylate, propyl acrylate, butyl acrylate, pentyl acrylate, hexyl acrylate, actyl acrylate, 2-ethyl hexyl acrylate, nonyl acryalte, decyl acrylate, dodecyl acrylate and cyano ethyl acrylate.

Examples of alkoxyalkyl acrylates represented by the above-menitoned general formula (4) include methoxy ethyl acrylate, ethoxy ethyl acrylate, butoxy ethyl acrylate and ethoxy propyl acrylate. One kind or two or more kinds thereof can be used as a main component of the acrylic rubber.

As a component of an acrylic rubber of a component (B) of the present invention, an unsaturated monomer copolymerizable with at least one selected from the compounds represented by the above-mentioned general formulae (3) to (5) as needed.

Examples of the unsaturated monomers include styrene, α-methyl styrene, acrylonitril, styrene halide, methacrylonitrile, acryl amide, methacryl amide, vinylnaphthalene, N-methylol acryl amide, vinyl acetate, vinyl chloride, vinylidene chloride, benzyl acrylate, methacrylic acid, itaconic acid, fumaric acid and maleic acid.

The Mooney viscosity of an acrylic acid used in the present invention is preferably 3 to 70, more preferably 4 to 60.

As the component (B) of the present invention, a vinyl aromatic hydrocarbon compound/conjugated diene compound block copolymer rubber having epoxy group can be used. The copolymer is a rubber obtainable by epoxydating a block copolymer or hydrogenated product thereof, comprising sequences of a vinyl aromatic hydrocarbon compound (a) and sequences of a conjugated diene compound.

The vinyl aromatic hydrocarbon compound/block copolymer and its hydrogenated product can be prepared by conventional method, for example, as described in JP-B-40-23798 and JP-A-59-133203.

Vinyl aromatic hydrocarbon compounds include styrene, vinyl toluene, divinyl benzene, α-methylstyrene, p-methylstyrene and vinylnaphthalene. Among them, styrene is preferable.

Conjugated diene compounds include butadiene, isoprene, piperylene, 1,3-pentadiene and 3-butyl-1,3-octadiene. Among them, butadiene and isoprene are preferable.

A rubber (B) of the present invention has preferably a heat of fusion of less than 3 J/g. The rubber can be vulcanized as needed, and can be used as a vulcanized rubber. Vulcanization can be achieved by the use of a polyfunctional organic acid, a polyfunctional amine compound, or an imidazole compound. But vulcanization methods are not limited thereto.

In a preferable embodiment of a liquid crystal polyester resin composition of the present invention, a liquid crystal polyester of a component (A) is in a continuous phase, and a rubber of a component (B) is in a dispersed phase.

Unless the component (A) is in a continuous phase, the gas barrier property drastically deteriorates and heat resistance and mechanical properties become insufficient, and thus it is not preferable.

The ratio of a component (A) and a component (B) in a liquid crystal polyester resin composition used in the present invention is, 56.0 to 99.9 weight %, preferably 65.0 to 99.9 weight %, more preferably 70 to 98 weight % of the component (A) and 44.0 to 0.1 weight %, preferably 35.0 to 0.1 weight %, more preferably 30 to 2 weight % of the component (B).

If the ratio of the component (A) is less than 56 weight %, heat resistance of the composition lowers, and thus it is not preferable. Further, if the ratio of the component (A) is more than 99.9 weight %, the improvement effect of film formation of the composition may not be sufficient, besides, the production cost becomes higher, and thus it is not preferable.

Production methods of a liquid crystal polyester resin composition of the present invention are not particularly limited and a known method can be used. For example, a method of mixing components in a solution state, then evaporating the solvent or precipitating in the solvent can be presented. From the industrial point of view, a method of kneading components in a molten state is preferable. For melt kneading, ordinary kneading machines such as a single-screw extruder, a twin-screw extruder and various kinds of kneaders can be used. In particular, twin-screw high kneader is preferable.

At the time of melt kneading, a cylinder setting temperature of a kneading machine is preferably in the range of 200 to 360° C., more preferably in the range of 230 to 350° C.

At the time of kneading, components may be preliminarily mixed with a device such as a tumbler of a Henschel mixer, or may be supplied for a certain amount individually to a kneading machine without preliminary mixing.

An inorganic filler may be used optionally in a liquid crystal polyester resin composition used in the present invention. Examples of inorganic fillers include calcium carbonate, talc, clay, silica, magnesium carbonate, barium sulfate, titanium oxide, alumina, gypsum, glass flake, glass fiber, carbon fiber, alumina fiber, silica alumina fiber, aluminum borate whisker and potassium titanate fiber.

Various kinds of additives may be further added to a liquid crystal polyester resin composition used in the present invention during a production or a processing thereafter as needed. Examples of the additives include an organic filler, an antioxidant, a heat stabilizer, a light stabilizer, a flame retarder, a lubricant, an antistatic agent, an inorganic or organic coloring agent, a rust proof agent, a crosslinking agent, a foaming agent, a fluorescent, a surface smoother, a surface brighter, a mold releasing agent such as a fluorine resin.

The kneaded resin composition is molded by various kinds of molding methods such as injection molding and protrusion molding. However, it is also possible to have a resin composition of the present invention without having a preliminary kneading process, but by dry blending at the time of an injection molding or a protrusion molding and kneading during the melting processing operation to have a molded article directly.

As a method of the film formation of the above-mentioned resin compositions, in general, a liquid crystal polyester resin composition film can be obtained by kneading a liquid crystal polyester resin composition obtained in the above-mentioned method with an extruder and winding up the molten resin extruded through a die. However, it is also possible to obtain a molded article directly by dry blending components, kneading during melting processing to have a resin composition without having a preliminary kneading process. As a die, in general, a T-shaped die (hereinafter abbreviated as T die) or a ring-like slit die can be used.

In a film formation using a T die, a liquid crystal polyester resin composition kneaded in a molten state with an extruder passes through a T die, usually arranged upside down, to become a sheet-like product, and then passes through a compressing roll and is rolled up in a longitudinal direction with a drawing device.

Setting conditions of an extruder in such a film formation can be optionally selected according to the composition. A setting temperature of the cylinder of an extruder is preferably in the range of 200 to 360° C., more preferably 230 to 350° C. Since a temperature outside the range may cause heat decomposition of a composition or difficulty in film formation, it is not preferable.

A slit gap of a T die (2) is preferably 0.2 to 1.2 mm. A thickness of a liquid crystal polyester resin composition film of the present invention can be controllable in the range of 1 to 1,000 μm. However, ones having 5 to 100 μm are often used practically, and thus a thickness in the range is preferable. A draft ratio of a liquid crystal polyester resin composition film of the present invention is in the range of 1.1 to 40.0.

Also a two-axis drawn film of the resin composition extruded from the T die can be obtained.

Methods of two-axis drawing in the production of a liquid crystal polyester resin composition film of the present invention are not particularly limited. Concrete examples of two-axis drawing include a consecutive drawing comprising single-axis drawing of a molten product of a composition of the present invention extruded from a T die of an extruder in the MD direction (machine direction) and drawing in the TD direction (perpendicular to machine direction), a simultaneous drawing comprising drawing a sheet extruded from a T die in both the MD and TD directions simultaneously, and a consecutive or simultaneous drawing of an undrawn sheet extruded from a T die with a twin-screw extruder or a tenter.

In any method, a film formation temperature is preferably in the range of from a temperature lower than the flow temperature of the liquid crystal polyester resin composition by 60° C. to a temperature higher than the flow temperature by 60° C. Film formation processing is conducted more preferably in the range of from the flow temperature to a temperature higher than the flow temperature by 30° C.

A slit gap of a T die is preferably 0.2 mm to 1.2 mm. An appropriate drawing ratio depends on a molding method. For example, in the case of drawing with a two-axis stretching machine, with the definition of the drawing ratio as (length after drawing/original length), a drawing ratio is 1.2 to 20.0, preferably 1.5 to 5.0, respectively in the MD drawing direction and the TD drawing direction. A drawing ratio smaller than 1.2 may deteriorates the tensile property, and a drawing ratio larger than 20.0 may result in insufficient smoothness of the film.

In the case of an inflation molding (film formation), the liquid crystal polyester resin composition is supplied to an extruder equipped with a die having a ring-like slit. Then the composition is melt-kneaded at a cylinder setting temperature of 200 to 360° C., preferably 230 to 350° C., and the molten resin is extruded from the ring-like slit as a tube-like film to the upper direction or the lower direction.

Die gap of a ring-like slit is, in general, 0.1 to 5 mm, preferably 0.2 to 2 mm, and a diameter of the ring-like slit is, in general, 20 to 1,000 mm, preferably 25 to 600 mm.

To the extruded tube-like molten resin film, by applying a draft in the machine direction (MD) as well as blowing air or an inert gas such as a nitrogen gas inside the tubular film, the expansion drawing of the film in the direction perpendicular to the machine direction (TD) can be achieved.

In the inflation film formation of a liquid crystal polyester resin composition of the present invention, a preferable blow ratio is 1.5 to 10, and a preferable MD drawing ratio is 1.5 to 40.

If the condition in the inflation film formation is not in the above-mentioned range, it is difficult to obtain a liquid crystal polyester resin composition film having an even thickness and excellent strength without a wrinkle, and thus it is not preferable.

After air-cooling or water-cooling of the perimeter, the expanded film passes through a nip roll and is rolled up.

In the inflation film formation, conditions can be selected optionally for achieving the expansion of a tube-like molten product film to have an even thickness and surface smoothness depending upon the composition of a liquid crystal polyester resin composition.

A film thickness of a liquid crystal polyester resin composition film obtained by the present invention is not particularly limited, but it is preferably 1 to 500 μm, more preferably 1 to 200 μm.

A wrapping material for electronic parts of the present invention comprises a liquid crystal polyester resin composition film obtained in the above-mentioned method Electronic parts, which can be wrapped with a wrapping material for electronic parts of the present invention, include chip type electronic parts such as an IC, a transistor, a diode, a capacitor, and a piezoelectric element resistor.

Examples of wrapping materials for electronic parts include a wrapping material for electronic parts comprising an emboss carrier tape with storage pockets for accommodating electronic parts continuously formed thereon and a cover tape capable of sealing the carrier tape.

For such a cover tape, a liquid crystal polyester resin composition film obtained in the above-mentioned method can be used.

Further, the carrier tape can be produced by applying an embossing processing on a liquid crystal polyester resin composition film obtained in the above-mentioned method by passing through a heated embossing roll, or by conducting an embossing processing treatment at the time of the film formation of the resin with an embossing roll preliminarily arranged below the T die.

In the present invention, a laminated film comprising a liquid crystal polyester resin composition film and a thermoplastic resin (C) film excluding liquid crystal polyester and a liquid crystal polyester resin composition can be used.

A thermoplastic resin here is not limited as long as it is not liquid crystal polyester or a liquid crystal polyester resin composition, but preferable examples include polyolefins such as polyethylene, polypropylene and ethylene-α-olefin copolymer, polyesters such as polystyrene, polycarbonate, poly(ethylene terephthalate) and poly(butylene terephthalate), polyacetal, polyamide, polyphenylene ether, polyether sulfone, ethylene-vinyl acetate copolymer, poly (vinyl chloride), poly(vinylidene chloride), polyphenylene sulfide, and a fluorine resin. Among these preferable examples, polyethylene, polypropylene, ethylene-α-olefin copolymer and poly(ethylene terephthalate) are further preferable. A film can be formed with one kind or a mixture of two or more kinds of the thermoplastic resins. Thermoplastic resins of the present invention include modified thermoplastic resins having a functional group introduced into a molecular chain.

A production method of such laminated film is not particularly limited and can be selected optionally according to the objective. Examples of production methods include a method of protruding from a die after laminating each molten resin in the die, a method of laminating resin films which are extruded from T dies, and a method of extruding molten resins laminated in advance from a die.

Multi-layer inflation film forming method can be also applicable for producing a laminated film. Such a laminated film can be applicable to a carrier tape.

A molded article of a liquid crystal polyester resin composition of the present invention can be obtained in various molding methods. For example, after obtaining a film or sheet of a liquid crystal polyester resin composition by a melt-extrusion method from a T die, an inflation film formation method, as mentioned above, an injection molding method, or a heat press method, various molding methods can be used with the obtained film or sheet. Examples of the molding methods include a vacuum molding method comprising heating and plasticizing the film or sheet with a heating device, fixing on a mold, and deaerating the inside the object to be molded so as to closely fix the film or sheet onto the mold, a compressed air molding method comprising deaerating the inside the film or sheet similarly and at the same time applying a compressed air so as to closely fix the film or sheet onto the mold, and a plug assist method comprising pushing a heated film or sheet clamped on a female mold into the mold with a plug and vacuum suction so as to closely fix the film or sheet onto the mold.

Without having a step of preliminary melt-kneading, a film or a sheet can be obtained directly by dry blending pellets of components and melt-kneading at the time of molding.

As to the shape of a molded container with a liquid crystal polyester resin composition film or sheet of the present invention, in a round container, a ratio between the depth of the container and the upper diameter of the container (hereinafter the ratio may be referred to as a stretch ratio) is preferably 1/100 or more, more preferably 1/10 or more, and in a rectangular container, a ratio between the depth of the container and the longest diagonal of the aperture of the container (hereinafter the ratio may be referred to as a stretch ratio) is preferably 1/100 or more, more preferably 1/10 or more.

A surface treatment may be applied to the surface of a liquid crystal polyester resin composition molded article of the present invention as needed. Examples of the surface treatment methods include a corona discharge treatment, a plasma treatment, a flame treatment, a sputtering treatment and a solution treatment.

A molded article of the present invention may be a laminated product with a layer comprising the above-mentioned liquid crystal polyester resin composition and a layer of a thermoplastic resin composition excluding a liquid crystal polyester. As the thermoplastic resin, thermoplastic resins excluding the above-mentioned thermoplastic resins can be used.

A liquid crystal polyester resin composition layer and a thermoplastic resin layer of the present invention are adhered by a compressing, preferably by a heat compression, and an adhesive layer may exist between the liquid crystal polyester resin composition layer and the thermoplastic resin layer.

Examples of adhesives include a hot melt adhesive, a polyurethane adhesive and an epoxy group containing copolymer.

A wrapping material for pouching of the present invention can be obtained by heat-sealing the above-mentioned liquid crystal polyester resin composition film with a certain size.

Further, the material can be used as a pouch prepared by forming a resin film in a bag-like shape, or a standing pouch prepared by forming a bag-like shape capable of standing alone.

A pouch or a standing pouch can be used with a three sided seal shape, a four sided seal shape, a pillow shape, a self-standing shape, or a bag in box shape.

As a wrapping material for a pouch or a standing pouch of the present invention, a laminated film comprising the above-mentioned liquid crystal polyester resin composition film and another kind of a thermoplastic resin film can be used as well.

Another thermoplastic resin film excluding a liquid crystal polyester and a liquid crystal polyester resin composition film herein is not particularly limited. But preferable examples thereof include films of polyolefins such as polyethylene and polypropylene, polyesters such as poly (ethylene terephthalate) and poly(butylene terephthalate), polyamide, polystyrene, acrylic resin, fluorine resin, polycarbonate, polyether sulfone, polyphenylene sulfane and polyphenylene ether. Among these preferable examples, polyolefin films are particularly preferable.

In the case of using such a laminated film for a wrapping material for pouch or standing pouch of the present invention, a hot melt adhesive or a polyurethane adhesive may be used between a liquid crystal polyester resin composition film and another thermoplastic resin film for improving the adhesion strength as needed.

Applications of the laminated films for pouch are not particularly limited, and a laminated film can be formed with the outside layer comprising a liquid crystal polyester resin composition film and the inside layer, contacting with the contents, comprising another thermoplastic resin film, or with a liquid crystal polyester resin composition film interposed between another thermoplastic resin films.

A pouch or standing pouch of the present invention can be used with the inside of the container deaerated or with the inside of the container filled with an inert gas such as nitrogen.

The pouch or standing pouch can be used broadly as a wrapping material of food or medical use. Examples of the applications include bags for curry, fish, meat, stew, pet food, detergent, cosmetics, seasonings, sarcocarp, beverage and transfusion liquid.

As a production method of a hollow molded article of the present invention, various kinds of blow molding methods can be presented. Examples thereof include an extrusion blow molding (direct blow molding method) comprising a blow molding so as not to cool off a melted and protruded pipe, or a parison, an injection blow molding method comprising molding a parison with an injection molding and a blow molding, and a drawing blow molding method comprising drawing at the time of blow molding. An appropriate blow molding method can be selected according to the objective.

A cylinder setting temperature and a die setting temperature of a blow molding machine in a blow molding method is preferably in the range of 200 to 360° C., more preferably 230 to 350° C.

A gas for blowing into the inside of the parison at the time of blow molding is not particularly limited but air is preferably used.

A hollow molded container comprising a laminated product including a layer of the above-mentioned liquid crystal polyester resin composition and a thermoplastic resin (excluding liquid crystal polyester and a liquid crystal polyester resin composition) is also included in the present invention.

A thermoplastic resin here (excluding liquid crystal polyester and a liquid crystal polyester resin composition) preferably comprises at least one selected from the group consisting of polyolefin, polystyrene, polycarbonate, polyester, polyacetal, polyamide, polyphenylene ether, polyether sulfone, ethylene-vinyl acetate, poly(vinylidene chloride), polyphenylene sulfide and a fluorine resin. Among these examples, polyolefin, polyester and polyamide are particularly preferable.

A laminated product of the present invention comprises at least two or more kinds including a liquid crystal polyester resin composition layer obtained in the above-mentioned method and a thermoplastic resin layer. Therefore, in addition to the two-layer structure, it is also possible to use a three layer structure having thermoplastic resin layers applied to the both sides of a liquid crystal polyester resin composition layer, and a five layer structure having liquid crystal polyester resin composition layers and thermoplastic resin layers laminated alternately. Furthermore, a laminated product comprising another layer other than the above-mentioned liquid crystal polyester resin composition layer or thermoplastic resin layer can be used as well.

Hollow molded containers comprising such laminated products can be produced by the above-mentioned blow molding method. Among blow molding method of laminated products, by a multilayer blow molding method comprising extruding multilayered resins in a molten state from a plurality of extruding machines to the same die having the same circular channel, laminating the layers in the die so as to form a parison, and expanding the parison with a gas pressure so as to closely fit to the mold, a blow molded article bottle of the present invention can be obtained.

A hollow molded container comprising a liquid crystal polyester resin composition layer and a thermoplastic resin layer is preferably used as a fuel container for its molding processability, heat resistance, gas barrier property, gasoline barrier property and gasohol barrier property.

For the use as a fuel container, it is preferable to have polyolefin as a thermoplastic resin comprising a laminated product, and a high density polyethylene having a density of 0.940 to 0.980 and a limiting viscosity of 2 to 7 dl/g.

A foamed product of the present invention can be obtained by molding a liquid crystal polyester resin composition comprising at least the above-mentioned component (A) and component (B). For example, it can be obtained by molding a liquid crystal polyester resin composition comprising 0.1 to 15 weight parts of a foaming agent based on 100 weight parts of the sum of the component (A) and the component (B).

Foaming agents here can be selected from commercially available foaming agents according to the objective. Examples thereof include sodium bicarbonate, ammonium bicarbonate, potassium carbonate, ammonium carbonate, sodium boron hydride, calcium azide, azodicarbonamide (hereinafter abbreviated as ADCA), azobisformamide (hereinafter abbreviated as ABFA), azobisisobutyronitrile (hereinafter abbreviated as AZDN), N,N'-dinitropentamethylenetetramine (hereinafter abbreviated as DPT), N,N'-dinitroso-N,N'-dimethylterephthalamide, benzenesulfonylhydrazide (hereinafter abbreviated as BSH), p-toluenesulfonylhydrazide (hereinafter abbreviated as TSH), p,p'-oxybisbenzenesulfonylhydrazide (hereinafter abbreviated as OBSH), p-toluenesulfonylsemicarbazide (hereinafter abbreviated as TSSC) and trihydrazinetriazine.

It is also possible to use a gas as a foaming agent of the present invention for obtaining a foamed product. In this case, an operation for homogeneously dispersing a gas in a molten resin for foaming is necessary.

Examples of the gases include nitrogen, carbon dioxide, fluorocarbon and chlorofluorocarbon.

It is preferable to select a foaming agent having a decomposition temperature close to a molding processing temperature according to the molding processing temperature of the resin composition.

If a foaming agent decompose in a stage when the resin is not sufficiently melted or if a foaming agent is not decomposed sufficiently even when the resin is completely melted, there would be problems such as poor appearance of the formed product and heterogeneous diameters of bubbles.

The present invention relates to a formed product of a liquid crystal polyester resin composition having excellent heat resistance, where a foaming agent which decompose and generate foams at a high temperature is preferably used. Particularly preferable examples of foaming agents include potassium carbonate, ABFA, trihydrazinetriazine, ADCA, DPT, OBSH and TSSC.

The ratio of a foaming agent of the present invention is preferably 0.1 to 15 weight parts based on 10 weight parts of the sum of the component (A) and the component (B).

If the ratio of the foaming agent is less than 0.1 weight part, a foaming effect cannot be acknowledged significantly, on the other hand, if the ratio is more than 15 weight parts, the appearance of the foamed product becomes poor and the strength becomes lowered, and thus neither is preferable.

The reason why a liquid crystal polyester resin composition of the present invention shows excellent film formation processability, flexibility, gas barrier property or heat resistance is not clearly known, but it can be attributed to a reaction generated between a liquid crystal polyester as the component (A) and a rubber as the component (B).

Hereinafter the present invention will be further explained with reference to examples. However, these examples are for presenting some embodiments, and thus the present invention is not limited thereto.

(1) A Liquid Crystal Polyester as the Component (A) (i) 10.8 kg (60 mole) of p-acetoxybenzoic acid, 2.49 kg (15 mole) of terephthalic acid, 0.83 kg (5 mole) of isophthalic acid and 5.45 kg (20.2 mole) of 4,4'-diacetoxydiphenyl were placed in a polymerization vessel having a comb-like kneading blade. The temperature in the vessel was increased while kneading under a nitrogen gas atmosphere. And polymerization was conducted for one hour at 330° C. with a strong kneading while removing acetic acid generated as a side product. Afterwards, the vessel was gradually cooled and at 200° C. the obtained polymer was taken out from the vessel. The obtained polymer was pulverized with a hammer mill produced by Hosokawa Micron Co., Ltd. to have particles of 2.5 mm or smaller. Furthermore, by treating the particles in a rotary kiln in a nitrogen gas atmosphere for three hours at 280° C., wholly aromatic polyester particles comprising the below-mentioned repeating unit with a flowing temperature of 324° C. were obtained.

A flowing temperature here denotes a temperature at which a melt viscosity of 48,000 poise is obtained when a resin heated with a temperature increase rate of 4° C./minute is extruded from a nozzle having an inner diameter of 1 mm and a length of 10 mm under a load of 100 kgf/cm$^2$ measured with a Koka flow tester type CFT-500 produced by Shimadzu Co., Ltd.

Hereinafter the liquid crystal polyester is referred to as A-1. The polymer showed an optical anisotropy at 340° C. or higher under load. The repeating unit of the liquid crystal polyester A-1 is as shown below:

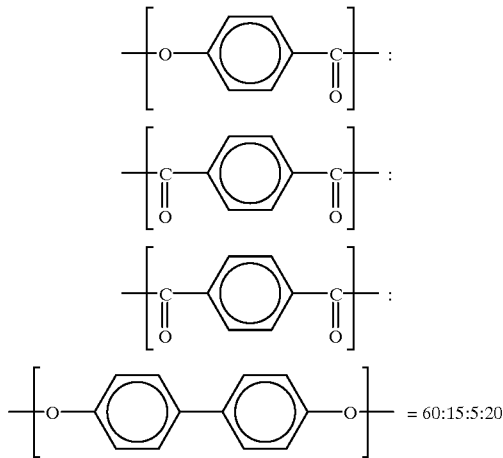

(ii) 16.6 kg (12.1 mole) of p-hydroxybenzoic acid, 8.4 kg (4.5 mole) of 6-hydroxy-2-naphthoic acid and 18.6 kg (18.2 mole) of acetic anhydride. were placed in a polymerization vessel having a comb-like kneading blade. The temperature in the vessel was increased while kneading under a nitrogen gas atmosphere. And polymerization was conducted for one hour at 320° C., and further for one hour at 320° under a reduced pressure of 2.0 torr while discharging acetic acid generated as a side product to outside the vessel. Afterwards, the vessel was gradually cooled and at 180° C. the obtained polymer was taken out from the vessel.

The obtained polymer was pulverized similarly as the above-mentioned (i). Furthermore, by treating the particles in a rotary kiln in a nitrogen gas atmosphere for five hours at 240° C., wholly aromatic polyester particles comprising the below-mentioned repeating unit with a flowing temperature of 270° C. were obtained. Hereinafter the liquid crystal polyester is referred to as A-2. The polymer showed an optical anisotropy at 280° C. or higher under load. The repeating unit of the liquid crystal polyester A-2 is as shown below:

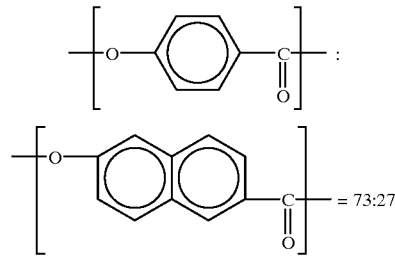

(iii) Liquid crystal mainly comprising poly(ethylene terephtharate) and parahydroxy benzoic acid "RODRUN LC-5000" produced by Unitika Ltd. was used. Hereinafter the polymer is referred to as A-3.

(2) (Meth)acrylate-ethylene-unsaturated Carboxylic Acid Ester Rubber (i) According to the method disclosed in Example 5 of JP-A-61-127709, a rubber comprising methyl acrylate/ethylene/glycidyl methacrylate=59.0/38.7/2.3 (weight ratio) having a Mooney viscosity of 15 was produced. The Mooney viscosity here refers to the value measured with a large rotor at 100° C. according to the JIS K6300. Hereinafter the rubber is referred to as B-1.

(ii) According to the method disclosed in Example 5 of JP-A-61-127709, a rubber comprising methyl acrylate/ethylene/glycidyl methacrylate=56.0/40.7/3.3 (weight ratio) having a Mooney viscosity of 12 was produced. Hereinafter the rubber is referred to as B-2.

(iii) According to the method disclosed in Example 5 of JP-A-61-127709, a rubber comprising methyl acrylate/ethylene/glycidyl methacrylate=52.5/45.0/2.5 (weight ratio) having a Mooney viscosity of 20 was produced. Hereinafter the rubber is referred to as B-3.

(iv) An epoxy group-containing acrylic rubber (Nipol AR31: Mooney viscosity (100° C.)=36, produced by Nippon Zeon Co., Ltd.) was used. Hereinafter the rubber is referered to as B-4.

(v) An epoxy group-containing acrylic rubber (Nipol AR51: Mooney viscosity (100° C.)=55, produced by Nippon Zeon Co., Ltd.) was used. Hereinafter the rubber is referered to as B-5.

(vi) An epoxidated natural rubber "ENR25" produced by KUMPULAN GUTHRIE BHD was used.

(vii) An epoxydated block copolymer of styrene-butadiene "Epo friend" produced by Daicel Chemical Co., Ltd. was used. Hereinafter the copolymer is referred to as B-7.

(3) Measurement Methods of Physical Properties of an Injection Molded Article

Tensile property: An ASTM4 type tensile dumbbell was molded, and a tensile strength and an elongation percentage were measured according to the ASTM D638.

Izod impact strength: Measurement was made with a test piece (3.2 mm thickness) with a notch according to the JIS K7110 both at a room temperature and at −30° C.

Hardness: A Rockwell hardness (R) was measured according to the ASTM D785.

Temperature deflection under load (TDUL): A test piece for TDUL measurement (127 mm length×12.7 mm width×6.4 mm thickness) was prepared, and a TDUL (load: 18.6 kg) was measured.

(4) Measurement Methods of Film Properties

Oxygen gas permeability: A permeability was measured according to the JIS K7126 A method (differential pressure) in a condition of a 20° C. temperature. The unit is cc/m$^2$·24 hr·1atm.

Water vapor permeability: A permeability was measured according to the JIS Z0208 (cut method) in conditions of a 40° C. temperature and a relative humidity of 90%. The unit is g/m²·24 hr·latm.

The oxygen permeability and the water vapor permeability were sought based on the film thickness converted to 25 μm.

Tensile property: Using a two type shape test piece, tensile properties in both MD and TD directions were measured according to the JIS Z1727.

Bending test: Film samples were cut out in the directions of both MD and TD, and each of them was subjected to a bending test according to JIS-p-8115 (1 Kgf of loading weight, 135° of bending angle, 1 mm of bending radius of curvature, 175/min of bending speed) using MIT bending machine Folding Endurance tester MIT-D type (Toyo Seiki Corporation). The bending times until breakage of the film was measured.

Pinhole test by enduring bending: Film sample was subjected to a pinhole test with using a Gelbo flow tester (Toyo Seiki Corporation) at a bending speed of 40 rpm. After 1000 times of repeated bending, the film was put on a white paper, and ink was coated on the film. The pinhole property was evaluated as below.

◯: Ink stain was not observed on the white paper.

X: Ink stain was observed on the white paper.

Surface tension: Measured by wetting method in which wetting agent (product of Wako Pure Chemical Co., Ltd.) was coated on the film according to JIS K6768. Untreated films and surface treated films (just after treatment and 4 weeks after treatment) by corona discharging machine (output power of 1.1 kw: Kasuga Electric Co.Ltd.) were evaluated.

(5) Injection Molding and Film Formation

Components in Table 1 were mixed with a Henschel mixer, then kneaded with a twin-screw extruder TEX-30 type produced by the Japan Steel Works Co., Ltd. at a cylinder setting temperature of 280° C. to 350° C. (350° C. for Examples 1–3 and Comparative Examples 1–4, 310° C. for Examples 4–5 and Comparative Examples 5–6, and 280° C. for Example 6 and Comparative Example 7) and a screw revolution rate of 200 rpm to obtain pellets of a resin composition to be provided for injection molding and film formation. An injection molding test piece was produced by injection molding with an injection molding machine PS40E5ASE type produced by Nissei Jushi Co., Ltd. with a molding temperature of 280° C. to 350° C. (350° C. for Examples 1–3 and Comparative Examples 1–4, 310° C. for Examples 4–5 and Comparative Examples 5–6, and 280° C. for Example 6 and Comparative Example 7) and a mold temperature of 80° C., and then provided for measurement. Results are shown in Table 1.

EXAMPLES 1, 2 AND COMPARATIVE EXAMPLES 1 to 3

Composition pellets obtained by kneading were supplied to a 20 mm φ single-screw extruder (produced by Tanabe Plastics Machinery, Ltd.), and extruded through a T die having a width of 100 mm and a slit gap of 0.3 mm to 0.8 mm at the cylinder setting temperature and T die setting temperature of 350° C., then rolled up with a cast roll to obtain an undrawin film. The film was treated with a simultaneous two axis drawing using a two-axis stretching machine (produced by Toyo Seiki Corporation) at a drawing temperature of 330°0 C. with a drawing ratio (MD×TD) of 2.7×2.7 so as to obtain a film having a thickness of 18 to 29 μm. Then physical properties of the film was measured. Results are shown in Table 1.

EXAMPLES 3 TO 6 AND COMPARATIVE EXAMPLES 4 to 7

Composition pellets obtained with the composition shown in Table 1 were melt-kneaded with a 45 mm φ single-screw extruder having a circular die at a cylinder setting temperature of 290 to 352° C. (352° C. for Example 3 and Comparative Examples 4, 310° for Examples 4–5 and Comparative Examples 5–6, and 290° C. for Example 6 and Comparative Example 7) and a revolution rate of 80 rpm. And the molten resin was extruded upward through the circular die having a diameter of 100 mm and a lip gap of 1.5 mm at a die setting temperature of 290 to 352° C. (352° C. for Example 3 and Comparative Examples 4, 310° C. for Examples 4–5 and Comparative Examples 5–6, and 290° C. for Example 6 and Comparative Example 7). Then dry air was supplied with pressure into the inner portion of the tubular film for expansion. After cooling off, the film was drawn through a nip roll with a roll up rate of 15 to 20 m/min to obtain a liquid crystal polyester resin composition film.

Drawing ratios in the roll up direction (MD direction) and the direction perpendicular to the roll up direction (TD direction) of the liquid crystal polyester resin composition film were controlled according to the amount of the dry air supplied with pressure and the roll up rate of the film. In this case, the drawing ratio in the MD direction was set to be 2.5 to 4.0, and the blow ratio in the TD direction was set to be 4.1 to 5.9. Physical properties of the obtained liquid crystal polyester resin composition films are shown in Table 1.

TABLE 1

| | | | | Physical properties of injection molded products | | | | | | | Physical properties of films | | | | | |
|---|---|---|---|---|---|---|---|---|---|---|---|---|---|---|---|---|
| | | | | Izod impact strength (with notch, kg·cm/cm) | | Tensile test | | | | | Water vapor permeability (g/m2·24 hr·atm) | Oxygen permeability (cc/m²·24 hr·atm) | Tensile test | | | |
| | | Composition (weight %) | | | | Tensile strength (kg/cm2) | Elongation percentage (%) | | | | | | Tensile strength (kg/cm2) | | Elongation percentage (%) | |
| | (A) | (B) | Others | 23° C. | −30° C. | | | Hardness | Thickness (μm) | | | | MD | TD | MD | TD |
| Example 1 | A-1 91 | B-1 9 | 0 | 71 | 36 | 1720 | 9.8 | R98 | 23 | 0.3 | 0.3 | | 2870 | 2350 | 10.3 | 12.6 |

TABLE 1-continued

| | | | | | | | | | | | | | | | |
|---|---|---|---|---|---|---|---|---|---|---|---|---|---|---|---|
| Example 2 | A-1 82 | B-1 18 | 0 | 78 | 39 | 1740 | 11.9 | R96 | 18 | 0.4 | 0.3 | 2240 | 1870 | 10.9 | 13.1 |
| Comparative example 1 | A-1 100 | 0 | 0 | 64 | 30 | 1610 | 5.1 | R100 | Film was not formed | — | — | — | — | — | — |
| Comparative example 2 | A-1 91 | 0 | 9*[1] | 37 | 14 | 1240 | 3.7 | R100 | Film was not formed | — | — | — | — | — | — |
| Comparative example 3 | A-1 82 | 0 | 18*[2] | 57 | 23 | 1370 | 9.3 | R98 | 29 | 0.4 | 0.4 | 2290 | 1980 | 3.7 | 5.5 |
| Example 3 | A-1 77 | B-2 23 | 0 | 83 | 42 | 1710 | 10.5 | R95 | 18 | 0.4 | 0.3 | 2030 | 1940 | 13.6 | 14.4 |
| Example 4 | A-2 88 | B-2 12 | 0 | 77 | 48 | 2080 | 17.4 | R86 | 29 | 0.4 | 0.4 | 3130 | 2880 | 11.8 | 15.3 |
| Example 5 | A-2 68 | B-2 32 | 0 | 79 | 50 | 1860 | 19.8 | R83 | 23 | 0.5 | 0.6 | 2580 | 2210 | 12.0 | 16.1 |
| Example 6 | A-3 74 | B-3 26 | 0 | 55 | 28 | 1230 | 9.7 | R65 | 37 | 3.1 | 3.4 | 1840 | 1590 | 6.1 | 8.3 |
| Comparative example 4 | A-1 57 | 0 | 43*[1] | 87 | 43 | 1090 | 5.8 | R81 | Film was not formed | — | — | — | — | — | — |
| Comparative example 5 | A-2 100 | 0 | 0 | 68 | 37 | 1700 | 10.1 | R105 | Film was not formed | — | — | — | — | — | — |
| Comparative example 6 | A-2 88 | 0 | 12*[3] | 37 | 19 | 1430 | 5.9 | R105 | Film was not formed | — | — | — | — | — | — |
| Comparative example 7 | A-3 100 | 0 | 0 | 40 | 21 | 1150 | 4.3 | R68 | Film was not formed | — | — | — | — | — | — |

| | Physical properties of films | | | | | |
|---|---|---|---|---|---|---|
| | Bending test | | Pinhole test | Surface tension (dyn/cm) | | |
| | MD | TD | | untreated | just after treatment*[4] | 4 weeks after treatment*[4] |
| Example 1 | >100,000 | >100,000 | ○ | 38 | >40 | >40 |
| Example 2 | >100,000 | >100,000 | ○ | 38 | >40 | >40 |
| Comparative example 1 | — | — | — | — | — | — |
| Comparative example 2 | — | — | — | — | — | — |
| Comparative example 3 | >100,000 | >100,000 | ○ | 38 | >40 | >40 |
| Example 3 | >100,000 | >100,000 | ○ | 38 | >40 | >40 |
| Example 4 | >100,000 | >100,000 | ○ | 38 | >40 | >40 |
| Example 5 | >100,000 | >100,000 | ○ | 38 | >40 | >40 |
| Example 6 | >100,000 | >100,000 | ○ | 38 | >40 | >40 |
| Comparative example 4 | — | — | — | — | — | — |
| Comparative example 5 | — | — | — | — | — | — |
| Comparative example 6 | — | — | — | — | — | — |
| Comparative example 7 | — | — | — | — | — | — |

*[1]EPDM "ESPRENE E506" produced by Sumitomo Chemical Co., Ltd. (Mooney viscosity: (100° C.) = 77)
*[2]"BONDFAST 7L" produced by Sumitomo Chemical Co., Ltd. (ethylene/methyl acrylate/glycidyl methacrylate = 67/30/3 weight ratio, flexural regidity = 60 kg/cm3)
*[3]low density polyetheylene "SUMIKATHENE F-101" produced by Sumitomo Chemical Co., Ltd. (MFR = 0.28 (g/10 min))
*[4]Corona discharging treatment

EXAMPLES 7 TO 9, COMPARATIVE EXAMPLES 8 TO 11

Components with the composition shown in Table 2 were mixed with a Henschel mixer, then melt-kneaded with a twin-screw extruder TEX-30 type produced by the Japan Steel Works Co., Ltd. at a cylinder setting temperature shown in Table 2 and a screw revolution rate of 180 rpm to obtain a composition. The composition was provided for injection molding with an injection molding machine PS40E5ASE type produced by Nissei Jushi Co., Ltd. with a molding temperature shown in Table 2 and a mold temperature of 80° C.

The composition pellets were melt-kneaded with a 30 mm φ single-screw extruder having a circular die at a cylinder setting temperature shown in Table 2 and a revolution rate of 50 rpm. And the molten resin was extruded upward through the circular die having a diameter of 50 mm and a lip gap of 1.2 mm at a die setting temperature shown in Table 2. Then dry air was supplied inside the tubular film for expansion. After cooling off, the film was drawn through a nip roll with a roll up rate of 9 m/min to obtain a liquid crystal polyester resin composition film.

Drawing ratios in the roll up direction (MD direction) and the direction perpendicular to the roll up direction (TD direction) of the liquid crystal polyester resin composition film were controlled according to the amount of the dry air supplied with pressure and the roll up rate of the film. In this case, the drawing ratio in the MD direction, the blow ratio in the TD direction, and the film thickness were as shown in Table 2. Physical properties of the obtained liquid crystal polyester resin composition films are shown in Table 3.

The heat decomposition temperature is the temperature at which the heat decomposition starts, which was measured with Thermogravimetric Analyzer TGA-50 type produced by Shimadzu Co., Ltd. using approximately 10 mg of finely cut film in a nitrogen atmosphere with the temperature increase at the rate of 10° C./min.

TABLE 2

| | Composition (weight %) | | | Melding and kneading conditions | Injection molding conditions | Film formation conditions | | | |
|---|---|---|---|---|---|---|---|---|---|
| | Component (A) | Component (B) | Other components | Cylinder setting temperature (° C.) | Cylinder setting temperature (° C.) | Cylinder setting temperature (° C.) | Die setting temperature (° C.) | MD drawing ratio | Blow ratio |
| Example 7 | A-1 78 | B-4 22 | 0 | 350 | 350 | 350 | 350 | 14.1 | 4.4 |
| Comparative example 8 | A-1 100 | 0 | 0 | 350 | 350 | 350 | 350 | Film was not formed | — |
| Comparative example 9 | A-1 78 | 0 | 22*[1] | 350 | 350 | 350 | 350 | 8.4 | 3.7 |
| Example 8 | A-2 92 | B-5 8 | 0 | 310 | 310 | 310 | 310 | 10.7 | 6.1 |
| Example 9 | A-2 68 | B-5 32 | 0 | 310 | 310 | 310 | 310 | 7.6 | 4.8 |
| Comparative example 10 | A-2 100 | 0 | 0 | 310 | 310 | 310 | 310 | Film was not formed | — |
| Comparative example 11 | A-2 92 | 0 | 8*[2] | 310 | 310 | 310 | 310 | Film was not formed | — |

*[1]ethylene-glycidyl methacrylate copolymer "BONDFAST 2C" produced by Sumitomo Chemical Co., Ltd. (composition: ethylene/glycidyl methacrylate = 94/6 weight ratio, MFR (190° C., 2.16 kg) = 3 g/10 min)
*[2]ethylene-propylene-diene copolymer rubber "ESPRENE E301" produced by Sumitomo Chemical Co., Ltd. (Mooney viscosity (100° C.) = 55)

TABLE 3

| | Composition (weight %) | | | Physical properties of injection molded products (TDUL (%)) | Physical properties of films | | | |
|---|---|---|---|---|---|---|---|---|
| | Component (A) | Component (B) | Other components | | Thickness ($\mu$m) | Decomposition starting temperature (° C.) | Water vapor permeability (g/m$^2$ · 24 hr · atm) | Oxygen permeability (cc/m$^2$ · 24 hr · atm) |
| Example 7 | A-1 78 | B-4 22 | 0 | 241 | 29 | 465 | 0.4 | 0.3 |
| Comparative example 8 | A-1 100 | 0 | 0 | 258 | — | — | — | — |
| Comparative example 9 | A-1 78 | 0 | 22*[1] | 232 | 37 | 427 | 0.5 | 0.4 |
| Example 8 | A-2 92 | B-5 8 | 0 | 179 | 18 | 476 | 0.4 | 0.3 |
| Example 9 | A-2 68 | B-5 32 | 0 | 155 | 43 | 433 | 0.4 | 0.4 |
| Comparative example 10 | A-2 100 | 0 | 0 | 183 | — | — | — | — |
| Comparative example 11 | A-2 92 | 0 | 8*[2] | 154 | — | — | — | — |

*[1]ethylene-glycidyl methacrylate copolymer "BONDFAST 2C" produced by Sumitomo Chemical Co., Ltd. (composition: ethylene/glycidyl methacrylate = 94/6 weight ratio, MFR (190° C., 2.16 kg) = 3 g/10 min)
*[2]ethylene-propylene-diene copolymer rubber "ESPRENE E301" produced by Sumitomo Chemical Co., Ltd. (Mooney viscosity (100° C.) = 55)

EXAMPLES 10 TO 11, COMPARATIVE EXAMPLES 12 TO 14

Components with the composition shown in Table 4 were mixed with a Henschel mixer, then kneaded with a twin-screw extruder TEX-30 type produced by the Japan Steel Works Co., Ltd. with the conditions shown in Table 4 to obtain pellets of a resin composition for injection molding and film formation. An injection molding test piece was produced with an injection molding machine PS40E5ASE type produced by Nissei Jushi Co., Ltd. with conditions shown in Table 1 and was measured. Results are shown in Table 4.

Film formation of a cover tape was conducted by melting and kneading resin pellets with a 45 mm φ single-screw extruder having a circular die with conditions shown in Table 5. And the molten resin was extruded upward through the circular die having a diameter of 50 mm and a die gap of 1.5 mm. Then dry air was supplied with pressure into the inner portion of the tubular film for expansion. After cooling off, the film was drawn through a nip roll to obtain a liquid crystal polyester resin composition film, which was used as a cover tape. A blow ratio at the time of film formation and a drawing ratio in the MD direction, etc. are shown in Table 5.

In film formation of a carrier tape, devices and the resin pellets, the same as the case of film formation of a cover tape were used to obtain the film as shown in Table 6. Then an obtained film was treated with emboss processing with a press molding machine to have pockets having a size of longitude×latitude=20 mm×20 mm, and a depth of 5 mm at a temperature of 250 to 300° C. to obtain a carrier tape.

At the time, appearance after the emboss processing was observed with naked eyes for evaluation. Namely, ones having the pockets molded accurately without a wrinkle on the film were judged to be good, and the others were judged to be poor. Then a cover tape heated to 260 to 310° C. was applied on a carrier tape after the above-mentioned emboss processing with pressure for evaluating a heat seal property. After cooling, the interface therebetween was observed with naked eyes for evaluation. Namely, ones with good adherence without having a crack or peeling off at the interface were judged to be good, and the others were judged to be poor. The obtained results are shown in Table 6.

Further, an oxygen permeability and a water vapor permeability for each of the obtained films for cover tape and films for carrier tape are shown in Tables 5 and 6.

TABLE 4

| | Resin composition (weight part) | | | Melding and kneading conditions | | Injection molding conditions | | Physical properties of injection molded products |
|---|---|---|---|---|---|---|---|---|
| | Component (A) | Component (B) | Other components | Cylinder setting temperature (° C.) | Screw revolution rate (rpm) | Injection molding temperature (° C.) | Mold temperature (° C.) | TDUL ° C. |
| Example 10 | A-1 78 | B-1 22 | 0 | 350 | 200 | 350 | 80 | 235 |
| Comparative example 12 | A-1 100 | 0 | 0 | 350 | 200 | 350 | 80 | 265 |
| Comparative example 13 | A-1 78 | 0 | *1 22 | 350 | 200 | 350 | 80 | 197 |
| Example 11 | A-2 92 | B-1 8 | 0 | 290 | 200 | 290 | 80 | 181 |
| Comparative example 14 | A-2 100 | 0 | 0 | 290 | 200 | 290 | 80 | 183 |

*1: Low density polyethylene "F-101" produced by Sumitomo Chemical Co., Ltd.

TABLE 5

| | Resin composition (weight part) | | | Cover tape film formation conditions | | | | | Physical properties of cover tape | | |
|---|---|---|---|---|---|---|---|---|---|---|---|
| | Component A | Component B | Other components | Cylinder setting temperature (° C.) | Screw revolution rate (rpm) | Die setting temperature (° C.) | Blow ratio | Drawing ratio | Film thickness μm | Oxygen permeability cc/ m$^2$ · atm · 24 hr | water vapor permeability g/ m$^2$ · atm · 24 hr |
| Example 10 | A-1 78 | B-1 22 | 0 | 352 | 80 | 354 | 4.2 | 7.1 | 12 | 0.5 | 0.4 |
| Comparative example 12 | A-1 100 | 0 | 0 | 352 | 80 | 354 | Film was not formed | Film was not formed | — | — | — |
| Comparative example 13 | A-1 78 | 0 | 22*1 | 352 | 80 | 354 | Film was not formed | Film was not formed | — | — | — |
| Example 11 | A-2 92 | B-1 8 | 0 | 292 | 80 | 294 | 6.3 | 6.8 | 9 | 0.6 | 0.5 |

TABLE 5-continued

| | Resin composition (weight part) | | | Cover tape film formation conditions | | | | | Physical properties of cover tape | | |
|---|---|---|---|---|---|---|---|---|---|---|---|
| | | | | Cylinder setting | Screw revolu- | Die setting | | | Film | Oxygen perme- | water vapor perme- |
| | Compo-nent A | Compo-nent B | Other compo-nents | tempera-ture (° C.) | tion rate (rpm) | tempe-rature (° C.) | Blow ratio | Drawing ratio | thick-ness μm | ability cc/ m² · atm · 24 hr | ability g/ m² · atm · 24 hr |
| Comparative example 14 | A-2 100 | 0 | 0 | 292 | 80 | 294 | Film was not formed | Film was not formed | — | — | — |

*¹Low density polyethylene "F-101" produced by Sumitomo Chemical Co., Ltd.

TABLE 6

| | Resin composition (weight part) | | | Carrier tape film formation conditions | | | | | Physical properties of carrier tapes | | | | |
|---|---|---|---|---|---|---|---|---|---|---|---|---|---|
| | | | | Cylinder setting | Screw revolu- | Die setting | | | Film | Oxygen perme- | Water vapor perme- | Outside appea-rance after | |
| | Compo-nent A | Compo-nent B | Other compo-nents | tempe-rature (° C.) | tion rate (rpm) | tempe-rature (° C.) | Blow ratio | Draw-ing ratio | thick-ness μm | ability cc/m² · atm · 24 hr | ability g/m² · atm · 24 hr | emboss proces-sing | Heat seal-ability |
| Example 10 | A-1 78 | B-1 22 | 0 | 352 | 80 | 354 | 2.9 | 8.6 | 42 | 0.2 | 0.1 | Good | Good |
| Comparative example 12 | A-1 100 | 0 | 0 | 352 | 80 | 354 | Film was not formed | Film was not formed | — | — | — | — | — |
| Comparative example 13 | A-1 78 | 0 | 22*¹ | 352 | 80 | 354 | Film was not formed | Film was not formed | — | — | — | — | — |
| Example 11 | A-2 92 | B-1 8 | 0 | 292 | 80 | 294 | 5.2 | 4.3 | 33 | 0.3 | 0.3 | Good | Good |
| Comparative example 14 | A-2 100 | 0 | 0 | 292 | 80 | 294 | Film was not formed | Film was not formed | — | — | — | — | — |

*¹Low density polyethylene "F-101" produced by Sumitomo Chemical Co., Ltd.

EXAMPLE 12, 13 AND COMPARATIVE EXAMPLE 15

Components with the composition shown in Table 7 were mixed with a stabilizer with a Henschel mixer, then melt-kneaded with a twin-screw extruder TEX-30 type produced by the Japan Steel Works Co., Ltd. with conditions shown in Table 7 (a cylinder setting temperature of 293° C.) to obtain compositions.

The composition pellets were melted and extruded with a 50 mm φ single-screw extruder having a circular die with conditions shown in Table 7, that is, the molten resin was extruded upward through the circular die having a diameter of 50 mm and a die gap of 1.5 mm with conditions shown in Table 7. Then dry air was supplied with pressure into the inner portion of the tubular film for expansion. After cooling off, the film was drawn through a nip roll to obtain a liquid crystal polyester resin composition film.

Drawing ratios in the roll up direction (MD direction) and the direction perpendicular to the roll up direction (TD direction) of the liquid crystal polyester resin composition film were controlled according to the amount of the dry air supplied with pressure and the roll up rate of the film. In this case, the blow ratio in the TD direction and the drawing ratio in the MD direction were as shown in Table 7. Gas perme-abilities of the obtained liquid crystal polyester resin com-position films are shown in Table 8.

With the above-mentioned films, three sided sealed pouches were produced with a heat sealer. Precooked curry was filled into the pouches, and the aperture portion of the pouches were sealed with the heat sealer. Then retort treat-ment was applied to the pouches at 130° C. for 30 minutes with a high temperature high pressure cooking-sterilizing tester produced by Hisaka Works, Ltd.

Water vapor permeabilities and oxygen permeabilities of the wrapping materials for pouching after the retort treat-ment are shown in Table 8. After the storage for 40 days at 70° C. for the retort treated pouches, the pouches were opened for contents examination. The results are shown in Table 8.

COMPARATIVE EXAMPLES 16 TO 17

The test the same as the above-mentioned was conducted on commercially available polyvinylidene chloride (PVDC) coat polyamide film and ethylene-vinyl acetate copolymer film. The obtained results are shown in Table 8.

TABLE 7

| | Composition (weight %) | | | Melding and kneading conditions | | Film formation conditions | | | | | |
|---|---|---|---|---|---|---|---|---|---|---|---|
| | Component (A) | Component (B) | Other components | Cylinder setting temperature (° C.) | Screw revolution rate (rpm) | Cylinder setting temperature (° C.) | Screw revolution rate (rpm) | Die setting temperature (° C.) | Blow rate | Drawing ratio | Film thickness (μM) |
| Example 12 | A-2 91 | B-1 9 | 0 | 293 | 200 | 293 | 90 | 297 | 5.1 | 6.9 | 18 |
| Example 13 | A-1 81 | B-7 19 | 0 | 345 | 200 | 345 | 90 | 345 | 3.1 | 5.9 | 33 |
| Comparative example 15 | A-1 81 | 0 | 19*1 | 345 | 200 | 345 | 90 | 345 | Film was not formed | — | — |

*1 SBR1502 produced by Sumitomo Chemical Co., Ltd. (Mooney viscosity (100° C.) = 52)

TABLE 8

| | Composition (weight %) | | | Physical properties | | | | |
|---|---|---|---|---|---|---|---|---|
| | | | | Gas permeability | | Gas permeability after retort treatment | | |
| | component (A) | component (B) | Other components | Oxygen permeability (cc/m² · 24 hr · 1 atm) | Water vapor permeability (g/m² · 24 hr · 1 atm) | Oxygen permeability (cc/m² · 24 hr · 1 atm) | Water vapor permeability (g/m² · 24 hr · 1 atm) | Contents deterioration*3 |
| Example 12 | A-2 91 | B-1 9 | 0 | 0.3 | 0.5 | 0.4 | 0.4 | ○ |
| Example 13 | A-1 81 | B-7 19 | 0 | 0.4 | 0.4 | 0.5 | 0.4 | ○ |
| Comparative example 16 | 0 | 0 | 100*1 | 7.4 | 9.2 | 17.3 | 20.5 | x |
| Comparative example 17 | 0 | 0 | 100*2 | 1.7 | 5.5 | 39.2 | 9.8 | x |

*1 PVDC coat polyamide film "HARDEN KN8002" produced by Toyobo Co., Ltd.
*2 ethylene-vinyl acetate copolymer film "EVAL EF-XL" produced by Kuraray Co., Ltd.
*3 Contents deterioration: ○: no deterioration in the contents x: deterioration of color or smell in the contents Physical properties were measured as mentioned below:

Bottle thickness: The average of thicknesses of the barrel portion of a bottle measured in three points was calculated.

Oxygen permeability: Oxygen permeability amount per one bottle of 1,500 cc content was measured with OXTRAN-100 type produced by Modern Control Co., Ltd. under the conditions of 23° C. and 0% RH.

Bottle contraction ratio: The ratio was calculated with the formula (V1−V2)/V1×100%, where V1 denotes the capacity of a bottle before filling a hot water, and V2 denotes the capacity of the bottle after filling hot water of 95° C., discharging the water after maintaining for 10 minutes, and leaving until the temperature of the bottle returns to the room temperature.

Gasoline permeability, gasohol permeability: 5 cc of gasoline (regular gasoline "Zearth" produced by Idemitsu-kosan Corp.) was placed in a cup and the gasoline permeability was measured according to the JIS Z208 in the conditions at a temperature of 23° C. and a humidity of 60%. Further, 4 cc of the above-mentioned gasoline and 1 cc of methanol were placed in a cup, and the gasohol permeability was measured in the same method.

Drop resistance: An obtained molded bottle was filled with water and dropped from a place of 16 m height. Then the appearance of the bottle was observed. The criteria are as follows:

○: No rupture is found in the bottle.

X: Rupture is observed in the bottle.

EXAMPLES 14, 15 AND COMPARATIVE EXAMPLES 18, 19

Components as shown in Table 1 were mixed with a Henschel mixer, then melt-kneaded with a twin-screw extruder TEX-30 type produced by the Japan Steel Works Co., Ltd. at a cylinder setting temperature of 350° C. and a screw revolution rate of 220 rpm to obtain a liquid crystal polyester resin composition pellets.

Extrusion blow molding of the composition pellets was conducted with a blow molding machine BM304 type produced by PLACO Co., Ltd. under the conditions of a screw diameter 50 mm, a screw revolution of 30 rpm, a die diameter of 25.5 mm, a nozzle diameter of 22 mm, a cylinder setting temperature of 350° C., a die temperature of 352° C., a blowing pressure of air of 2.2 kg/cm$^2$, a cycle time of 25 seconds and a cooling time of 15 seconds to obtain a rectangular bottle having a 1,500 cc capacity.

Physical properties of the obtained bottle were measured. Results are shown in Table 9.

EXAMPLES 16 TO 18, COMPARATIVE EXAMPLES 20, 21

A bottle was molded and physical properties thereof were measured in the conditions the same as Example 14 as shown in Table 9 except that a cylinder setting temperature of TEX-30 type was set to be 290° C., a cylinder setting temperature of the blow molding machine 290° C., and a die temperature 290° C. The obtained results are shown in Table 9.

EXAMPLES 19

Using a multilayer direct blow machine, high density polyethylene ("SHOLEX 4551H", MFR=0.05 g/10 min, density=0.945 g/cm$^3$) produced by Showa Denko K. K. was melt-kneaded with a revolution rate of 120 rpm and a cylinder setting temperature of 235° C. using a single-screw extruder I for the outer layer of a molded article, having a screw diameter of 50 mm φ, and the liquid crystal polyester resin composition pellets of Example 17 were melt-kneaded with a revolution rate of 35 rpm and a cylinder setting temperature of 295° C. using a single-screw extruder II for the inner layer of a molded article, having a screw diameter of 50 mm φ.

Then the molten products were put into a die head individually from each extruder, combined with a multi-manifold method inside the die at a die setting temperature of 295° C., and layers were superimposed. Then the product was extruded from the die into a mold and air was blown, that is, with a direct blow method to obtain a rectangular bottle having a capacity of 2,500 cc.

A test piece was cut out from the bottle to measure the gasoline permeability and the gasohol permeability. Thickness of the inner layer and the outer layer was observed for the cross section of the test piece with a microscope. The obtained results are shown in Table 10.

COMPARATIVE EXAMPLE 22

In the conditions the same as Example 19 except that pellets of the liquid crystal polyester A-2 were used in place of the pellets of the liquid crystal polyester resin composition of Example 19, molding was conducted. However, a good molded article was not obtained.

TABLE 9

| | Composition (weight %) | | | Physical properties | | | |
| --- | --- | --- | --- | --- | --- | --- | --- |
| | Component (A) | Component (B) | Other components | Bottle thickness (μm) | Oxygen permeability (g/m2 · 24 hr · atm) | Bottle contraction ratio (%) | Appearance |
| Example 14 | A-1 67 | B-1 33 | 0 | 43 | 0.13 | ~0*[1] | ○ |
| Example 15 | A-1 91 | B-2 9 | 0 | 62 | 0.04 | ~0*[1] | ○ |
| Comparative example 18 | A-1 100 | 0 | 0 | not moldable | — | — | — |
| Comparative example 19 | A-1 67 | 0 | 33*[2] | not moldable | — | — | — |
| Example 16 | A-2 78 | B-6 22 | 0 | 33 | 0.12 | 0.01 | ○ |
| Example 17 | A-2 86 | B-2 14 | 0 | 59 | 0.03 | ~0*[1] | ○ |
| Example 18 | A-3 92 | B-1 8 | 0 | 77 | 1.05 | 0.1 | ○ |
| Comparative example 20 | A-2 100 | 0 | 0 | not moldable | — | — | — |
| Comparative example 21 | 0 | 0 | 100*[3] | 66 | 5.9 | 14 | ○ |

*[1]Less than detectable limit
*[2]ethylene-propylene-diene rubber EPDM "ESPRENE E501A" produced by Sumitomo Chemical Co., Ltd. (Mooney viscosity (100° C.) = 53)
*[3]PET(logarithm viscosity = 0.8)

TABLE 10

| | | Composition | | | Physical properties | | |
|---|---|---|---|---|---|---|---|
| | Liquid crystal polyester resin composition layer | | Thermoplastic resin layer | | Gasoline permeability | Gasohol permeability | Drop |
| | | Thickness (μm) | Resin | Thickness(μm) | (g/m$^2$ · day · atm) | (g/m$^2$ · day · atm) | resistance |
| Example 19 | Resin pellets of Example 17 | 41 | HDPE*[1] | 1900 | 0.006 | 0.010 | ○ |
| Comparative example 22 | A-2 | — | HDPE[1] | — | not moldable | — | — |

*[1]high density polyethylene "SHOLEX 4551H" produced by Showa Denko, K.K.

As a foaming agent of the component (C), the below-mentioned was used:

D-2: Trihydrazine triazine produced by Finons Industrial Chemicals.

sheet. Physical properties of the obtained sheet are shown in Table 11.

TABLE 11

| | Composition (weight %) | | | Foaming agent (weight part)*[2] | Physical properties | | | | | | |
|---|---|---|---|---|---|---|---|---|---|---|---|
| | Component A | Component B | Other component | | Density (g/cc) | MD tensile strength (kg/cm2) | MD elongation (%) | TD tensile strength (kg/cm$^2$) | TD tensile strength (%) | TD tensile strength (MD/TD) | Foamed product shape |
| Example 20 | A-2 76 | B-1 24 | 0 | D-2 8.0 | 1.02 | 1050 | 13.6 | 930 | 12.5 | 1.1 | ○ |
| Comparative example 23 | A-2 100 | 0 | 0 | D-2 8.0 | 1.15 | 1490 | 8.7 | 910 | 9.3 | 1.6 | x |
| Comparative example 24 | A-2 76 | 0 | 24*[1] | D-2 8.0 | 0.98 | 550 | 5.3 | 190 | 3.9 | 29 | x |

*[1]EPDM "ESPRENE E505" produced by Sumitomo Chemical Co., Ltd. (Mooney viscosity (100° C.) = 77)
*[2]Ratio of a foaming agent based on 100 weight parts of the sum of component A, component B and other components Physical properties of a foamed product were evaluated as mentioned below.

Tensile test: Tensile strength and elongation percentage were found in both the MD direction (extrusion direction) and the TD direction according to the ASTM D638.

Foamed product shape: Shape of an obtained foamed product was evaluated by observation with an optical microscope with the below-mentioned criteria:

○: The foamed product has uniform fine foams.

X: The foamed product has foams with heterogeneous shapes and diameters of various sizes.

EXAMPLE 20 AND COMPARATIVE EXAMPLES 23, 24

A component (A), a component (B) and other components as shown in Table 11 were mixed with a Henschel mixer, then kneaded with a twin-screw extruder PCM-30 type produced by Ikegai Tekko Co., Ltd. at a cylinder setting temperature of 295° C. and a screw revolution rate of 60 rpm.

After mixing the obtained pellets with a foaming agent with the composition shown in Table 11, the mixture was supplied to a single-screw extruder having a T die, produced by Tanabe Plastics Machinery, Ltd. and extruded from the T die having a 100 mm width and a 3 mm die gap at a cylinder setting temperature of 297° C., a screw revolution rate of 20 rpm, a die setting temperature of 297° C. to obtain a foamed Evaluation of retort containers was conducted as follows:
Stretch ratio: In a round container, a ratio between the depth of the container and the upper diameter of the container, and in a rectangular container, a ratio between the depth of the container and the longest diagonal of the aperture of the container.

Drop impact test: After filling a container with water and sealing with a lid member, the container was dropped from a place of 1 m height and the impact breakage was examined.

Retort Test

Appearance: After filling a molded container with a commercially available curry (House curry) and sealing with a lid member, retort treatment was conducted at 120° C. for 60 minutes with a high temperature high pressure cooking-sterilizing tester. Then the appearance of the container was evaluated with the below-mentioned criteria:

○: No change is found in the outside appearance, and contents is not leaked.

X: Distortion or deformation is found in the appearance.

Further, the container was opened after leaving for 30 days, and the contents was evaluated with the below-mentioned criteria:

○: No change is found in the color or smell of the contents.

X: Change is found in the color or small of the contents.

EXAMPLE 21

Components shown in Table 12 were mixed with a Henschel mixer, then melt-kneaded with a twin-screw extruder TEX-30 type produced by the Japan Steel Works Co., Ltd. with conditions shown in Table 12 to obtain a composition. Pellets of the composition were kneaded with a 50 mm φ single-screw axis extruder having a circular die at a cylinder setting temperature of 350° C. and a screw revolution rate of 60 rpm. And the molten resin was extruded upward through the circular die having a diameter of 50 mm and a die gap of 1.5 mm at a die setting temperature of 348° C. Then dry air was supplied into the inner portion of the tubular film for expansion. After cooling off, the film was drawn through a nip roll with a roll up rate of 15 m/min to obtain a liquid crystal polyester resin composition film.

Drawing ratio and the blow ratio in the MD direction was 2.9 and 3.2, respectively. Further, the thickness, flexibility and gas permeability are shown in Table 12.

A rectangular container having a 120 cm by 200 cm size and 30 mm depth was produced from the film with a vacuum pressure molding machine by molding at a heating temperature of 330° C.

The appearance of the obtained container was good. Results of the drawing ratio, drop impact test and retort test are shown in Table 12.

COMPARATIVE EXAMPLE 25

In the conditions the same as Example 21 except that the composition ratio was as shown in Table 12, inflation film formation was tried. However, a good film was not obtained.

EXAMPLE 22

In the conditions the same as Example 21 except that the composition ratio and the setting temperature was as shown in Table 12, melt-kneading was conducted. The obtained pellets were extruded from a T die having a die gap of 1.5 mm, a die width of 650 mm, and a die setting temperature of 290° C., then after passing through a nip roll of a roll setting temperature of 170° C., rolled up by a take-up roll. Physical properties of the obtained film are shown in Table 12. A round-shaped cup having an upper aperture diameter of 60 mm, a bottom diameter of 50 mm and 80 mm depth was produced from the film with a vacuum pressure molding machine by molding at a heating temperature of 236°0 C. The appearance of the obtained cup was good, and no distortion was observed. Results of the evaluation of the cup are shown in Table 12.

COMPARATIVE EXAMPLE 26

In the conditions the same as Example 22 except that A-2 was used instead of the composition in Example 22, melting and kneading were conducted. The obtained pellets were melt-kneaded from a T die in the conditions the same as Example 22. Physical properties of the obtained sheet are shown in Table 12. A container was molded from the sheet in the conditions the same as Example 22, but a good molded product was not obtained.

EXAMPLE 23

In the conditions the same as Example 22 except that the composition was the same as Table 12, melting and kneading were conducted. The obtained pellets were melted and extruded from a T die having a die gap of 1.2 mm, a die width of 650 mm, and a die setting temperature of 303° C., then after passing through a nip roll of a roll setting temperature of 170° C., rolled up by a take-up roll. Physical properties of the obtained film are shown in Table 12.

A two-liquid hardening type polyurethane-type adhesive AD-315 produced by Toyo Moton Co., Ltd. was coated on the film. After drying the solvent, a polyethylene terephthalate film E5000 having a 25 μm thickness produced by Toyobo Co., Ltd. was superimposed on the coated surface and adhered by a heat compression at 240° C. to obtain a laminated film. A rectangular container having a 60 by 67 mm size and a depth of 10 mm was produced by press processing the film. Evaluation results are shown in Table 12.

TABLE 12

| | Composition (weight %) | | | Melt-kneading | | | | | Physical properties | | | | | |
| | | | | Cylinder setting temp. (° C.) | Screw revolution rate (rpm) | Thickness (μm) | Bending test (number of times) | | Oxygen permeability (g/m2 · 24 hr · atm) | Water vapor permeability (g/m2 · 24 hr · atm) | Stretch ratio | Drop impact test | Retort test | |
| | Component (A) | Component (B) | Other component | | | | MD | TD | | | | | Appearance | Contents |
|---|---|---|---|---|---|---|---|---|---|---|---|---|---|---|
| Example 21 | A-1 76 | B-1 24 | 0 | 349 | 170 | 39 | >100000 | >100000 | 0.3 | 0.3 | 2/23.3 | ○ | ○ | ○ |
| Comparative example 25 | A-1 76 | 0 | 24*¹ | 349 | 170 | Film was not formed | — | — | — | — | — | — | — | — |
| Example 22 | A-2 90 | B-2 10 | 0 | 305 | 170 | 92 | >100000 | >100000 | 0.1 | 0.1 | 6/8 | ○ | ○ | ○ |
| Comparative example 26 | A-2 100 | 0 | 0 | 305 | 170 | 120 | <10000 | <10000 | 0.1 | 0.1 | not moldable | — | — | — |
| Example 23 | A-2 68 | B-1 32 | 0 | 305 | 170 | 56 | >100000 | >100000 | 0.2 | 0.2 | 1.9 | ○ | ○ | ○ |

*¹Linear low density polyethylene "SUMIKATHENE L705" produced by Sumitomo Chemical Co., Ltd. (MFR. = 7 g/10 min)

A liquid crystal polyester resin composition of the present invention is excellent in heat resistance, molding processability and mechanical properties, particularly in impact resistance and tensile property, capable of improving anisotropy of a molded article. Furthermore, film formation processability can be improved at a low cost, and a film produced for the composition has excellent gas barrier property, drawing property and flexibility.

Owing to such characteristics, a liquid crystal polyester resin composition of the present invention can be broadly used in various applications such as molded articles, containers, tubes, sheets, fibers, coating materials, wrapping films for food, wrapping films for chemicals, and wrapping films for electronic parts.

What is claimed is:

1. A liquid crystal polyester resin composition comprising 65.0 to 99.9 weight % of a liquid crystal polyester (A) in a continuous phase and 35.0 to 0.1 weight % of a rubber (B) having a functional group reactive with the liquid crystal polyester in a dispersed phase, wherein said liquid crystal polyester (A) is a member selected from the group of combinations of repeat units (I)–(VI) consisting of:

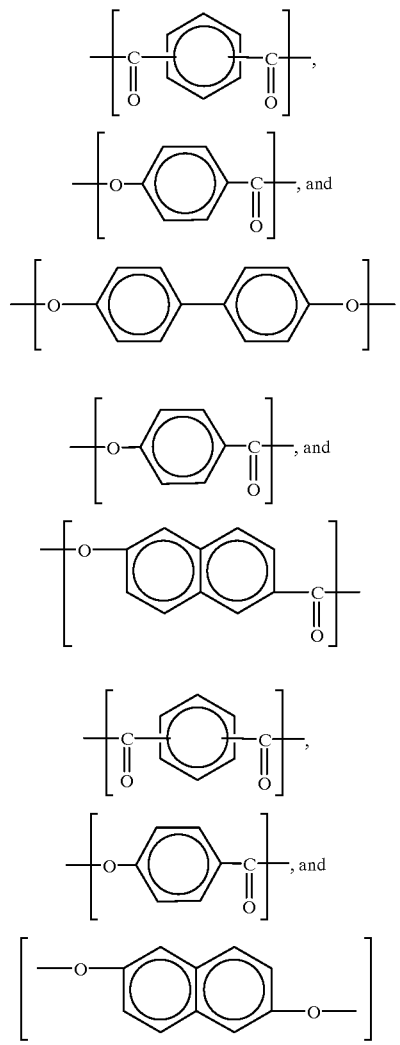

-continued

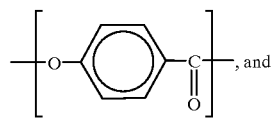

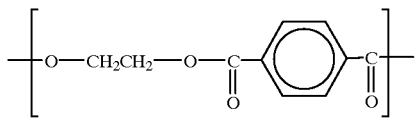

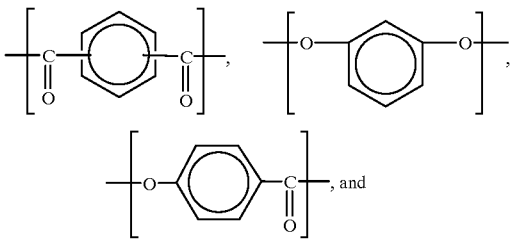

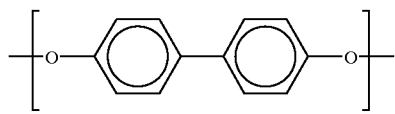

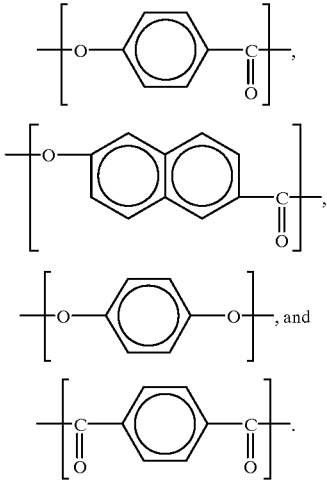

2. The liquid crystal polyester resin composition according to claim 1 comprising 70 to 98 weight % of the liquid crystal polyester (A) and 30 to 2 weight % of the rubber (B).

3. The liquid crystal polyester resin composition according to claim 1, wherein the functional group reactive with the liquid crystal polyester in the rubber (B) is an epoxy group, an oxazolyl group or an amino group.

4. A liquid crystal polyester resin composition according to claim 1, wherein the functional group reactive with the liquid crystal polyester in the rubber (B) is an epoxy group.

5. A liquid crystal polyester resin composition according to claim 4, wherein the rubber (B) comprises (meth)acrylate-ethylene-unsaturated carboxylic acid glycidyl ester and/or unsaturated glycidyl ether copolymer rubber.

6. A liquid crystal polyester resin composition according to claim 5, wherein (meth)acrylate comprises at least one selected from the group consisting of methyl acrylate, methyl methacrylate, n-butyl acrylate, n-butyl methacryalte, tert-butyl acrylate, tert-butyl methacrylate and 2-ethyl hexyl acrylate, 2-ethyl hexyl methacrylate.

7. A liquid crystal polyester resin composition according to claim 5, wherein the rubber (B) is a copolymer comprising more than 40 but less than 97 weight % of (meth)acrylate unit, more than 3 but less than 50 weight % of an ethylene unit, and 0.1 to 30 weight % of an unsaturated carboxylic acid glycidyl ester and/or unsaturated glycidyl ether unit.

8. A liquid crystal polyester resin composition according to claim 4, wherein the Mooney viscosity of the rubber (B) is in the range of 3 to 70.

9. A liquid crystal polyester resin composition according to claim 5, wherein the Mooney viscosity of the rubber (B) is in the range of 3 to 30.

10. A liquid crystal polyester resin composition according to claim 4, wherein the rubber (B) is obtained by epoxydating a copolymer or a hydrogenated copolymer comprising sequences of a vinyl aromatic hydrocarbon compound (a) and sequences of a conjugated diene compound.

11. A liquid crystal polyester resin composition according to claim 1, wherein the liquid crystal polyester (A) comprises at least 30 mole % of a repeating unit represented by the below mentioned formula:

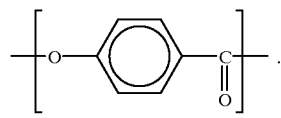

12. A liquid crystal polyester resin composition according to claim 1, wherein the liquid crystal polyester (A) is obtained by the reaction of aromatic dicarboxylic acid, aromatic diol and aromatic hydroxycarboxylic acid.

13. A liquid crystal polyester resin composition according to claim 1, wherein the liquid crystal polyester (A) is obtained by the reaction of a combination of different kinds of aromatic hydroxycarboxylic acids.

14. A liquid crystal polyester resin composition according to claim 1, wherein the liquid crystal polyester (A) comprises the below-mentioned repeating unit combination:

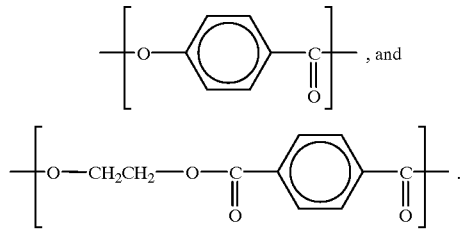

15. A liquid crystal polyester resin composition according to claim 1, wherein the liquid crystal polyester (A) comprises the below-mentioned repeating unit combination:

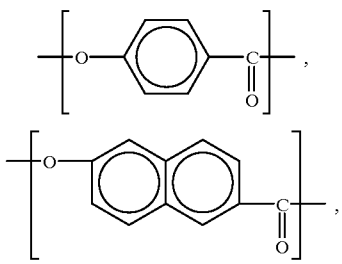

-continued

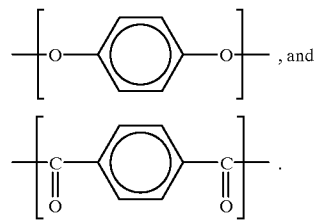

16. A liquid crystal polyester resin composition according to claim 1, wherein the liquid crystal polyester (A) comprises the below-mentioned repeating unit combination:

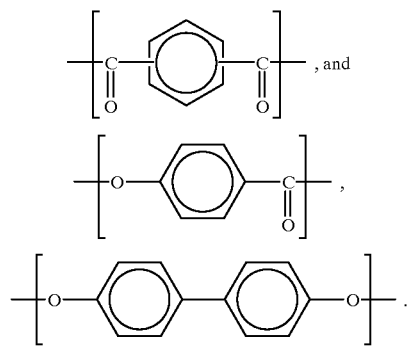

17. A liquid crystal polyester resin composition according to claim 1, wherein the liquid crystal polyester (A) comprises the below-mentioned repeating unit combination:

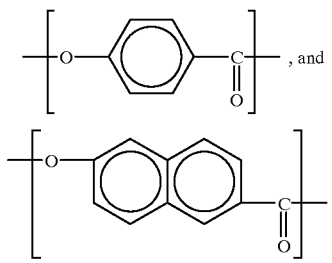

18. A film obtained comprising the liquid crystal polyester resin composition according to claim 1.

19. A film obtained by single-axis drawing or two-axis drawing of the liquid crystal polyester resin composition according to claim 1 melt-extruded from a T die.

20. A film obtained by inflation molding of the liquid crystal polyester resin composition according to claim 1.

21. A laminated film comprising a film which comprises the liquid crystal polyester resin composition according to claim 1 and a film which comprises a thermoplastic resin excluding the liquid crystal polymer and the liquid crystal polyester resin composition, having at least two layers.

22. A laminated film according to claim 21, wherein the thermoplastic resin comprises at least one selected from the group consisting of polyethylene, polypropylene, polystyrene, polycarbonate, polyethylene terephthalate, polybuthylene terephthalate, polyacetal, polyamide polyphenylene ether, polyether sulfone, ehylene-α-olefin copolymer, polyvinyl chloride, polyvinylidene chloride, polyacetal, polyphenylene sulfide, ethylene-vinyl acetate copolymer and a fluorine resin.

23. A laminated film according to claim 22, produced by coextrusion of a liquid crystal polyester resin composition and a thermoplastic resin excluding the liquid crystal polyester and the liquid crystal polyester resin composition with a coextrusion die having two or more layers.

24. A wrapping material for pouching comprising the liquid crystal polyester resin composition according to claim 1.

25. A wrapping material for electronic parts comprising the liquid crystal polyester resin composition according to claim 1.

26. A wrapping material for electronic parts comprising a cover tape and emboss carrier tape obtainable from the liquid crystal polyester resin composition according to claim 1.

27. A liquid crystal polyester resin composition container obtained with the liquid crystal polyester resin composition according to claim 1 with the ratio of the depth of the container and the aperture of the container of 1/10 or more in a round container, and with the ratio of the depth of the container and the longest diagonal at the aperture of the container of 1/10 or more.

28. A liquid crystal polyester resin composition container and lid each of which comprises a sheet or a film comprising the liquid crystal polyester resin composition according to claim 1 adhered to and closely sealed together to accomodate contents therein.

29. A retort container which is the liquid crystal polyester resin composition container according to claim 27.

30. A hollow molded container comprising the liquid crystal polyester resin composition according to claim 1.

31. A blow molded container comprising a layer of the liquid crystal polyester resin composition according to claim 1 and a layer of a thermoplastic resin composition excluding the liquid crystal polyester.

32. A fuel container which is the blow molded container according to claim 31.

33. A fuel container according to claim 32, wherein the thermoplastic resin is a high density polyethylene having a density of 0.940 to 0.980 and a limiting viscosity of 2 to 7 dl/g.

34. A retort container which is the liquid crystal polyester resin composition container according to claim 28.

* * * * *